(12) United States Patent
Martini et al.

(10) Patent No.: US 11,712,917 B2
(45) Date of Patent: Aug. 1, 2023

(54) SECURITY DOCUMENT AND MANUFACTURING METHOD THEREOF

(71) Applicant: SICPA HOLDING SA, Prilly (CH)

(72) Inventors: Thibaut Martini, Nyon (CH); Gebhard Ritter, Lausanne (CH); Jean Garnier, Corcelles-le-Jorat (CH); Riccardo Ruggerone, Echallens (CH); Patrick Veya, Aclens (CH)

(73) Assignee: SICPA HOLDING SA, Prilly (CH)

( * ) Notice: Subject to any disclaimer, the term of this patent is extended or adjusted under 35 U.S.C. 154(b) by 50 days.

(21) Appl. No.: 17/613,399

(22) PCT Filed: May 18, 2020

(86) PCT No.: PCT/EP2020/063757
§ 371 (c)(1),
(2) Date: Nov. 22, 2021

(87) PCT Pub. No.: WO2020/234211
PCT Pub. Date: Nov. 26, 2020

(65) Prior Publication Data
US 2022/0242159 A1    Aug. 4, 2022

(30) Foreign Application Priority Data
May 22, 2019    (EP) .................................... 19175971

(51) Int. Cl.
*B42D 25/40*    (2014.01)
*B42D 25/351*    (2014.01)
(Continued)

(52) U.S. Cl.
CPC ........... *B42D 25/351* (2014.10); *B42D 25/40* (2014.10); *C09D 11/101* (2013.01);
(Continued)

(58) Field of Classification Search
CPC .............................. B42D 25/40; B42D 25/351
See application file for complete search history.

(56) References Cited

U.S. PATENT DOCUMENTS 6,686,014 B1 *   2/2004   Washburn ................. G09F 3/10
                                                                    428/41.9
2004/0023080 A1    2/2004   Buhay et al.
(Continued)

FOREIGN PATENT DOCUMENTS

| CA | 2446559 | 11/2002 |
|----|---------|---------|
| CN | 1656036 | 8/2005  |

(Continued)

OTHER PUBLICATIONS

Notification of First Chinese Office Action in counterpart Chinese Patent Application No. 202080037283.0 dated Sep. 19, 2022 (and English language translation of Office Action).

(Continued)

*Primary Examiner* — Kyle R Grabowski
(74) *Attorney, Agent, or Firm* — Muncy, Geissler, Olds & Lowe, P.C.

(57) ABSTRACT

The present invention relates to the technical field of security documents comprising a security feature, such as a windowed security thread, a security foil, a security patch, a hologram or an ink printed security feature, and a protective coating, and methods of manufacturing of said security documents. The security feature has a security feature thickness $t_f$ of at least about 5 μm (micrometers) and a security feature surface facing away from the substrate consisting of a first region adjacent to the edges of the security feature and a second region non-adjacent to the edges of the security feature. The protective coating covers the security feature surface facing away from the substrate, a first substrate surface adjacent to the edges of the security feature, and a (Continued)

second substrate surface, which is different from the substrate surface covered by the security feature and the first substrate surface. The protective coating covering the security feature surface facing away from the substrate and the first substrate surface is transparent, the protective coating covering the first region has a thickness $t_{b1}$, the protective coating covering the second region has a thickness $t_{b2}$, the protective coating covering the first substrate surface has a thickness $t_c$, and the protective coating covering the second substrate surface has a thickness $t_a$. The thickness $t_c$ is larger than the thickness $t_f$, which is larger than the thickness $t_a$; the thickness $t_{b2}$ is larger than the thickness $t_a$; and either the thickness $t_c$ is larger than the thickness $t_{b1}$, which is larger than or equal to the thickness $t_{b2}$; or the thickness $t_c$ is equal to the thickness $t_{b1}$, which is larger than the thickness $t_{b2}$. The variable protective coating thickness on the surface of the security document provides the inventive security document with an increased resistance against physical and chemical attacks from the environment, while maintaining the mechanical resistance properties required for such security documents.

17 Claims, 7 Drawing Sheets

(51) Int. Cl.
| | | |
|---|---|---|
| G02B 1/14 | (2015.01) | |
| C09D 11/101 | (2014.01) | |
| C09D 11/102 | (2014.01) | |
| C09D 11/104 | (2014.01) | |
| C09D 11/30 | (2014.01) | |
| B42D 25/29 | (2014.01) | |
| B42D 25/328 | (2014.01) | |
| B42D 25/378 | (2014.01) | |

(52) U.S. Cl.
CPC .......... *C09D 11/102* (2013.01); *C09D 11/104* (2013.01); *C09D 11/30* (2013.01); *G02B 1/14* (2015.01); *B42D 25/29* (2014.10); *B42D 25/328* (2014.10); *B42D 25/378* (2014.10)

(56) References Cited

U.S. PATENT DOCUMENTS

| | | | |
|---|---|---|---|
| 2007/0017647 A1 | 1/2007 | Habik et al. | |
| 2016/0325578 A1 | 11/2016 | Ritter et al. | |
| 2020/0298609 A1* | 9/2020 | Hazen | B29C 66/53461 |

FOREIGN PATENT DOCUMENTS

| | | | | |
|---|---|---|---|---|
| CN | 201638473 | | 11/2010 | |
| CN | 105793058 | | 7/2016 | |
| EP | 0256170 | | 2/1988 | |
| EP | 1388428 | | 2/2004 | |
| EP | 3279006 A1 | * | 2/2018 | |
| EP | 3392054 A1 | * | 10/2018 | B42D 25/24 |
| WO | 02100960 | | 12/2002 | |
| WO | 2011064162 | | 6/2011 | |
| WO | 2013127715 | | 9/2013 | |
| WO | 2013186167 | | 12/2013 | |
| WO | 2014041121 | | 3/2014 | |
| WO | 2014067715 | | 5/2014 | |

OTHER PUBLICATIONS

"Chemistry & Technology of UV & EB Formulation for Coatings, Inks & Paints", published in 7 volumes in 1997-1998 by John Wiley & Sons in association with SITA Technology Limited.
"Chemistry & Technology of UV & EB Formulation for Coatings, Inks & Paints", vol. III, "Photoinitiators for Free Radical Cationic and Anionic Polymerization", 2nd edition, by J. V. Crivello & K. Dietliker, edited by G. Bradley and published in 1998 by John Wiley & Sons in association with SITA Technology Limited.
Printing Technology, J. M. Adams and P.A. Dolin, Delmar Thomson Learning, 5th Edition, 2002, pp. 359-360.
International Search Report and Written Opinion issued with respect to application No. PCT/EP2020/063757.

* cited by examiner

SECURITY DOCUMENT AND MANUFACTURING METHOD THEREOF

FIELD OF THE INVENTION

The present invention relates to the technical field of security documents comprising a security feature, such as a windowed security thread, a security foil, a security patch, a hologram or an ink printed security feature, and a protective coating, and methods of manufacturing of said security documents. The security documents according to the present invention exhibit increased resistance against physical and chemical attacks from the environment.

BACKGROUND OF THE INVENTION

With the constantly improving quality of color photocopies and printings and in an attempt to protect security documents such as banknotes, value documents or cards, transportation tickets or cards, tax banderols, and product labels against counterfeiting, falsifying or illegal reproduction, it has been the conventional practice to incorporate various security features in these documents. Typical examples of security means include security threads, windows, fibers, planchettes, foils, patches, decals, holograms, watermarks, security features obtained from security inks comprising security materials such as magnetic pigments, UV absorbing pigments, IR absorbing pigments, optically variable pigments, light polarizing pigments, photoluminescent pigments, conductive pigments and surface-enhanced Raman spectroscopy particles.

It is known to provide security documents, in particular banknotes, with dirt-repellent protective coatings to extend their life and fitness for circulation. Protective coatings are protective layers facing the environment of the document, which are obtained from thermally curable varnishes, radiation-curable varnishes and combinations thereof.

European patent application publication no. EP0256170A1 proposes a currency paper printed with an ink containing 1-10% by weight of micronized wax and coated with a protective layer consisting essentially of cellulose ester or cellulose ether. The protective layer is applied on the surface of the currency paper by spraying, dipping or roller coating, thereby, providing a constant thickness of the protective layer.

US patent application publication no. US20070017647A1 provides a security paper for producing value documents having a flat substrate provided at least partly with a dirt-repellent protective layer for extending the life time and fitness for circulation. The disclosed protective layer comprises at least two lacquer layers, a first lower lacquer layer being formed by a physically drying lacquer layer applied directly on the paper substrate serving for closing the paper substrate pores, and a second upper lacquer layer, which protects the substrate from physical and chemical influences. The first lower lacquer layer is present on the substrate in a constant coating weight of from 1 to 6 g/m², preferably of from 2 to 4 g/m², and the second upper lacquer layer is present on the substrate in a constant coating weight of from 0.5 to 3 g/m², preferably of from 1 to 2 g/m².

International patent application publication no. WO2014067715A1 teaches imparting soil resistance to a security document comprising a substrate by applying on the substrate a radiation curable protective varnish comprising cationically curable compounds and fluorinated compounds. The radiation curable protective varnish is applied by screen printing or flexography printing so that to ensure a constant protective layer thickness lower than 5 µm, preferably in between 1 and 3 µm. For security documents comprising security features, the radiation curable protective varnish may be applied or not on the surface of said security feature.

Canadian patent application publication no. CA2446559A1 describes a long-lived security paper comprising a security element, wherein the security paper is covered by a matt protective lacquer layer, which is omitted on the surface of the security element. The surface of the security element may be covered by a gloss protective lacquer layer. Should the security paper be covered by both a matt protective lacquer and a gloss protective lacquer, said lacquers are applied either by flexography printing in a quantity of 2 to B grams of liquid lacquer per m² or by screen printing in a quantity of 5 to 15 grams liquid lacquer per m² and the printing steps are executed in perfect register, thereby providing a constant thickness of protective lacquer layer on the surface of the security element and the remaining surface of the security paper.

Security threads, foils, patches, holograms and ink printed security features have been widely used as security features in security documents, in particular banknotes. These security features are produced separately and integrated into the security document during its production (for e.g.: security threads, security foils, security patches, holograms) or printed on the security document during its production (for e.g.: ink printed security features).

Security threads, foils and patches are produced on reels of substrate by several techniques selected from the group of printing, coating, vapor deposition, etching, varnishing and/or combination thereof, which are finally sliced into security threads, foils and patches to be inserted into the security document substrates during their production (for e.g.: security threads), or applied by gluing or by hot-stamping onto the security document substrates (for e.g.: security foils, security patches).

Holograms are diffractive optically variable security features, which can be integrated in windowed security threads, security foils, security patches, or applied as such to the security document substrate for e.g. on a transparent window of a security document.

Ink printed security features are security features obtained by printing on a security document a security ink comprising one or more security materials selected from magnetic pigments, UV absorbing pigments, IR absorbing pigments, optically variable pigments, light polarizing pigments, photoluminescent pigments, conductive pigments, surface-enhanced Raman spectroscopy particles and plasmon resonance particles.

Because of the thickness of the security threads, foils, patches, holograms and ink printed security features, which is up to 50 micrometers, and/or the difference of their surface (surface energy, smoothness, etc.) as compared to the adjacent surface of the security document substrate, the currently available protection methods of security documents comprising such security features, which are based on application of a protective coating having a constant thickness by flexography, offset or screen printing, do not suffice for impeding the deterioration of these security features. In particular, the edges of these security features are directly exposed to the environment and its mechanical and chemical attacks, which lead to the deterioration of the security features.

Protective coatings applied by flexography are characterized by a substantially constant coating thickness. As the thickness of protective coatings applied by flexography is typically 2-3 micrometers (corresponding to a protective varnish deposit of 2.0-3.0 g/m², the protective varnish composition having a typical density comprised in a range from 1 to 1.2 g/cm³), such protective coatings are typically too thin to efficiently protect security features, such as windowed security threads, foils, patches, holograms and ink printed security features, which usually have a thickness of at least about 5 micrometers (μm).

The same problem is encountered when using protective coatings applied by offset printing.

Protective coatings applied by rotary or flatbed screen printing are characterized by a substantially constant coating thickness, which is significantly larger than the thickness of protective coatings applied by flexography or offset printing. Protective coatings applied by screen printing have a typical thickness equal to or larger than 10 micrometers (corresponding to a typical protective varnish deposit of 10-15 g/m², the protective varnish composition having a typical density comprised in a range from 1 to 1.2 g/cm³). Such large protective coating thickness potentially ensures a satisfactory protection of certain windowed security threads, foils, patches, holograms and ink printed security features. Nevertheless, thick protective coatings applied on the entire surface of the security document result in significant mechanical resistance issues of the protected security document, for instance in crumpling test, as a result of the stiffness of the thick protective coating. To avoid the impairment of the mechanical properties, the protective coating covering the entire surface of the security document should have a thickness below about 5 micrometers (μm). Additionally, printing thick protective coatings results in higher production costs of the protected security documents.

Thus, a need remains for security documents, in particular banknotes, comprising a security feature selected from a windowed security thread, a security foil, a security patch, a hologram and an ink printed security feature characterized by a thickness of at least about 5 micrometers (μm), which exhibit increased resistance against physical and chemical attacks from the environment, while maintaining the mechanical resistance properties required for such security documents. Furthermore, a need remains for cost-efficient and time-expedient manufacturing methods of such security documents.

SUMMARY OF THE INVENTION

Accordingly, it is the object of the present invention to provide a security document comprising a security feature selected from: a windowed security thread, a security foil, a security patch, a hologram and an ink printed security feature and characterized by a thickness of at least about 5 μm (micrometers), which exhibits increased resistance against physical and chemical attacks from the environment when compared to the security documents of the prior art, while maintaining the mechanical resistance properties required for such security documents. This is achieved by the security document claimed herein comprising:
a substrate,
a security feature applied to or inserted into a portion of the substrate, wherein the security feature is selected from a windowed security thread, a security foil, a security patch, a hologram and a ink printed security feature, has a security feature thickness $t_f$ of at least 5 μm (micrometers) and a security feature surface facing away from the substrate consisting of a first region adjacent to the edges of the security feature and a second region non-adjacent to the edges of the security feature, and
a protective coating covering
the security feature surface facing away from the substrate,
a first substrate surface adjacent to the edges of the security feature, and
a second substrate surface, which is different from the substrate surface covered by the security feature and the first substrate surface;
wherein
the protective coating covering the security feature surface facing away from the substrate and the first substrate surface is transparent,
the protective coating covering the first region has a thickness $t_{b1}$,
the protective coating covering the second region has a thickness $t_{b2}$,
the protective coating covering the first substrate surface has a thickness $t_c$, and
the protective coating covering the second substrate surface has a thickness $t_a$;
characterized in that
the thickness $t_c$ is larger than the thickness $t_f$, which is larger than the thickness $t_a$;
the thickness $t_{b2}$ is larger than the thickness $t_a$;
and
either the thickness $t_c$ is larger than the thickness $t_{b1}$, which is larger than or equal to the thickness $t_{b2}$;
or the thickness $t_c$ is equal to the thickness $t_{b1}$, which is larger than the thickness $t_{b2}$.

The variable protective coating thickness on the surface of the security document with larger coating thicknesses ($t_c$, $t_{b1}$) on the first substrate surface, which is adjacent to the edges of the security feature and the first region of the security feature surface facing away from the substrate than on the remaining surface of the security document, wherein the coating thickness $t_c$ on the first substrate surface is larger than the thickness $t_f$ of the security feature and larger than or equal to the coating thickness $t_{b1}$ on the first region provides the security document claimed herein with an increased resistance against physical and chemical attacks from the environment when compared to the security documents comprising similar security features of the prior art. As the large coating thicknesses ($t_c$, $t_{b1}$) are present only on the first substrate surface, which is adjacent to the edges of the security feature and on the first region of the security feature surface facing away from the substrate i.e. on a very limited surface of the security document, the mechanical properties and the production costs of the security document are not affected, as it is the case for the security documents presenting a large coating thickness over the entire surface of the security document.

Further claimed and described herein is a method of manufacturing the security document claimed herein comprising the steps:
a) providing a security document comprising:
a substrate,
a security feature applied to or inserted into a portion of the substrate, wherein the security feature is selected from a windowed security thread, a security foil, a security patch, a hologram and an ink printed security feature, has a security feature thickness $t_f$ of at least 5 μm (micrometers) and a security feature surface facing away from the substrate consisting of a first region adjacent to the edges of the security feature and a second region non-adjacent to the edges of the security feature;

b) inkjet printing a radiation curable varnish on the security feature surface facing away from the substrate and a first substrate surface adjacent to the edges of the security feature, wherein the varnish deposit on the first substrate surface is equal to or higher than the varnish deposit on the first region adjacent to the edges of the security feature, and the varnish deposit on the first region is equal to or higher than, preferably higher than, the varnish deposit on the second region; and c1) printing by offset or flexography a curable varnish on a second substrate surface, which is different from the substrate surface covered by the security feature and the first substrate surface, and optionally on the security feature surface facing away from the substrate and the first substrate surface;

or c2) inkjet printing a radiation curable varnish on a second substrate surface, which is different from the substrate surface covered by the security feature and the first substrate surface;

and d) curing the curable varnishes to provide a protective coating covering the security feature surface facing away from the substrate, the first substrate surface and the second substrate surface;

wherein the varnish deposit on the second region is higher than the varnish deposit on the second substrate surface.

The manufacturing method claimed and described herein enables the selective application in one printing pass of different varnish deposits on different surfaces of a security document, including the front and back side of a security document, thereby providing security documents with increased chemical and physical resistance. The methods of applying a protective varnish on a security document according to the prior art are based on the exclusive use of flexography or screen printing, and consequently, manufacturing security documents with variable coating thickness with said methods would require an extensive number of printing stations, leading to complicated, expensive and time-consuming manufacturing methods. Further, as the inventive manufacturing method described herein enables the application of large varnish deposits selectively on the first substrate surface, which is adjacent to the edges of the security feature and on the first region of the security feature surface facing away from the substrate, the manufacturing method claimed herein remains cost-efficient.

DETAILED DESCRIPTION

Definitions

Figure 1:
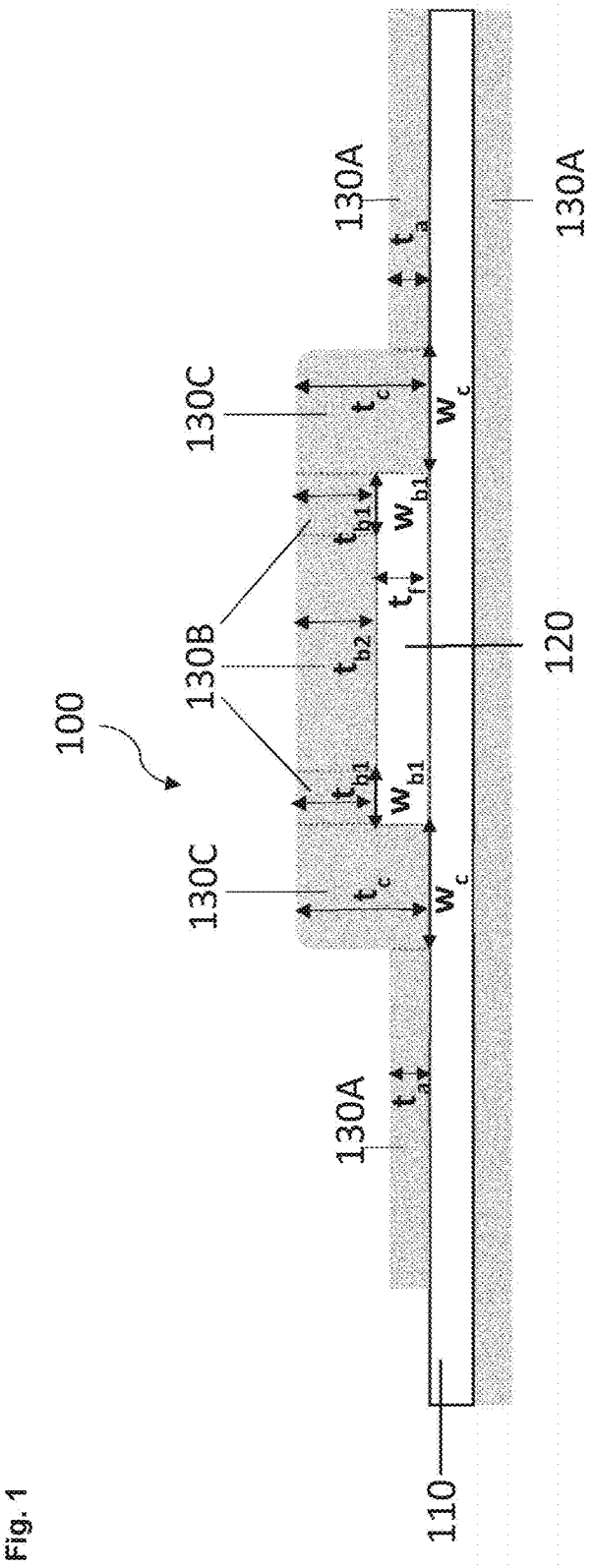
FIG. 1-3, 4A-4C schematically illustrate a security document (100) according to the present invention comprising a substrate (110), a security feature (120) as described herein and a protective coating (130A, 130B, 130C).

The following definitions are to be used to interpret the meaning of the terms discussed in the description and recited in the claims.

As used herein, the article "a/an" indicates one as well as more than one and does not necessarily limit its referent noun to the singular.

As used herein, the term "about" means that the amount or value in question may be the specific value designated or some other value in its neighborhood. Generally, the term "about" denoting a certain value is intended to denote a range within ±5% of the value. As one example, the phrase "about 100" denotes a range of 100±5, i.e. the range from 95 to 105. Preferably, the range denoted by the term "about" denotes a range within ±3% of the value, more preferably ±1%. Generally, when the term "about" is used, it can be expected that similar results or effects according to the invention can be obtained within a range of ±5% of the indicated value.

As used herein, the term "and/or" means that either all or only one of the elements of said group may be present. For example, "A and/or B" means "only A, or only B, or both A and B". In the case of "only A", the term also covers the possibility that B is absent, i.e. "only A, but not B".

The term "comprising" as used herein is intended to be non-exclusive and open-ended. Thus, for instance a solution comprising a compound A may include other compounds besides A. However, the term "comprising" also covers, as a particular embodiment thereof, the more restrictive meanings of "consisting essentially of" and "consisting of", so that for instance "a solution comprising A, B and optionally C" may also (essentially) consist of A and B, or (essentially) consist of A, B and C.

Where the present description refers to "preferred" embodiments/features, combinations of these "preferred" embodiments/features are also deemed to be disclosed as long as the specific combination of "preferred" embodiments/features is technically meaningful.

Surprisingly, it was found that a security document comprising:
a substrate,
a security feature applied to or inserted into a portion of the substrate, wherein the security feature is selected from a windowed security thread, a security foil, a security patch, a hologram and a ink printed security feature, has a security feature thickness $t_f$ of at least 5 μm (micrometers) and a security feature surface facing away from the substrate consisting of a first region adjacent to the edges of the security feature and a second region non-adjacent to the edges of the security feature, and
a protective coating covering
the security feature surface facing away from the substrate,
a first substrate surface adjacent to the edges of the security feature, and
a second substrate surface, which is different from the substrate surface covered by the security feature and the first substrate surface;
wherein
the protective coating covering the security feature surface facing away from the substrate and the first substrate surface is transparent, and
the protective coating covering the first region has a thickness $t_{b1}$,
the protective coating covering the second region has a thickness $t_{b2}$,
the protective coating covering the first substrate surface has a thickness $t_c$, and
the protective coating covering the second substrate surface has a thickness $t_a$, characterized in that the thickness $t_c$ is larger than the thickness $t_f$, which is larger than the thickness $t_a$;

the thickness $t_{b2}$ is larger than the thickness $t_a$;

and either the thickness larger than the thickness $t_{b1}$, which is larger than or equal to the thickness $t_{b2}$;

or the thickness $t_c$ is equal to the thickness $t_{b1}$, which is larger than the thickness $t_{b2}$, exhibits increased resistance against physical and chemical attacks from the environment when compared to the security documents of the prior art, while maintaining the mechanical resistance properties required for such security documents.

In the security document according to the present invention the thickness $t_c$ is larger than the thickness $t_f$, which is larger than the thickness $t_a$ ($t_c > t_f > t_a$), the thickness $t_{b2}$ is larger than the thickness $t_a$ ($t_{b2} > t_a$), and either the thickness $t_c$ is larger than the thickness $t_{b1}$, which is larger than or equal to the thickness $t_{b2}$ ($t_c > t_{b1} \geq t_{b2}$), or the thickness $t_c$ is equal to the thickness $t_{b1}$, which is larger than the thickness $t_{b2}$ ($t_c = t_3 > t_{b2}$).

In other words, the present invention is directed to a security document comprising:

a substrate, a security feature applied to or inserted into a portion of the substrate, wherein the security feature is selected from a windowed security thread, a security foil, a security patch, a hologram and a ink printed security feature, has a security feature thickness $t_f$ of at least 5 µm (micrometers) and a security feature surface facing away from the substrate consisting of a first region adjacent to the edges of the security feature and a second region non-adjacent to the edges of the security feature, and a protective coating covering the security feature surface facing away from the substrate, a first substrate surface adjacent to the edges of the security feature, and a second substrate surface, which is different from the substrate surface covered by the security feature and the first substrate surface;

wherein the protective coating covering the security feature surface facing away from the substrate and the first substrate surface is transparent, and the protective coating covering the first region has a thickness $t_{b1}$, the protective coating covering the second region has a thickness $t_{b2}$, the protective coating covering the first substrate surface has a thickness $t_c$, and the protective coating covering the second substrate surface has a thickness $t_a$;

characterized in that the thickness $t_c$ is larger than the thickness $t_f$, which is larger than the thickness $t_a$; the thickness $t_{b2}$ is larger than the thickness $t_a$; and the thickness $t_c$ is larger than the thickness $t_{b1}$, which is larger than or equal to the thickness $t_{b2}$;

or the thickness $t_c$ is larger than the thickness $t_f$, which is larger than the thickness $t_a$; the thickness $t_{b2}$ is larger than the thickness $t_a$; and the thickness $t_c$ is equal to the thickness $t_{b1}$, which is larger than the thickness $t_{b2}$.

Thus, a preferred embodiment according to the present invention is directed to a security document as described herein, wherein the thickness $t_c$ is larger than the thickness $t_f$, which is larger than the thickness $t_a$ ($t_c > t_f > t_a$), the thickness $t_{b2}$ is larger than the thickness $t_a$ ($t_{b2} > t_a$), and the thickness $t_c$ is larger than the thickness $t_{b1}$, which is larger than or equal to the thickness $t_{b2}$ ($t_c > t_{b1} \geq t_{b2}$). A further preferred embodiment according to the present invention is directed to a security document as described herein, wherein the thickness $t_c$ is larger than the thickness $t_f$, which is larger than the thickness $t_a$ ($t_c > t_f > t_a$), the thickness $t_{b2}$ is larger than the thickness $t_a$ ($t_{b2} > t_a$), and the thickness $t_c$ is equal to the thickness $t_{b1}$, which is larger than the thickness $t_{b2}$ ($t_c = t_{b1} > t_{b2}$).

As attested for example by the results summarized in Table 3, the security document claimed herein presenting a variable protective coating thickness on its surface with larger coating thicknesses ($t_c$, $t_{b1}$) on the first substrate surface, which is adjacent to the edges of the security feature and the first region of the security feature surface facing away from the substrate than on the remaining surface of the security document, wherein the coating thickness $t_c$ on the first substrate surface is larger than the thickness $t_f$ of the security feature and larger than or equal to the coating thickness $t_{b1}$ on the first region, exhibits excellent chemical resistance reflected by no or little change of the security feature in the conducted chemical resistance tests. The chemical resistance exhibited by the security documents according to the present invention is significantly higher than the one achieved with uniform protective coatings according to the prior art having a coating of between about 2 µm to about 10 µm (see for e.g.: Table 3: samples E1-E5 versus samples C2-C3 and C8-C11). Comparable chemical resistance can be achieved with security documents having a very large uniform coating thickness of about 20 µm to 30 µm as observed for the comparative examples C5, C6 and C13. Nevertheless, as well accepted within the security documents community, a uniform protective coating thickness larger than 10 µm on the whole surface of a security document, such as a banknote, does not constitute a viable solution because of technical reasons, such as the stiffness of the coated security document, and cost reasons. Such problems are not encountered with the security document according to the present invention due to the presence of the large coating thicknesses ($t_c$, $t_{b1}$) only on the first substrate surface, which is adjacent to the edges of the security feature and on the first region of the security feature surface facing away from the substrate i.e. on a very limited surface of the security document, The protective coating covering the security feature surface facing away from the substrate and the first substrate surface is a transparent coating, which is preferably colorless so that the protective coating does not change the color of the security document. As used herein, a coating of a specific thickness ($t_c$, $t_{b1}$, $t_{b2}$) is deemed to be transparent if the haze measured on a substrate covered by said coating having the specific thickness ($t_c$, $t_{b1}$, $t_{b2}$) is at the most 5% higher in absolute value than the haze measured for said substrate, wherein the haze measurement is conducted as described in ASTM D1003 (Standard Test Method for Haze and Luminous Transmittance of Transparent Plastics) using a DC 650 Spectrophotometer (from DATACOLOR).

As used herein, the term "security document" refers to a document having a value such as to render it potentially liable to attempts at counterfeiting or illegal reproduction and which is usually protected against counterfeit or fraud by at least one security feature. Typical examples of security documents include without limitation banknotes, deeds, tickets, checks, vouchers, fiscal stamps and tax labels, agreements and the like, identity documents such as passports, identity cards, visas, bank cards, credit cards, transaction cards, access documents, entrance tickets and the like.

As used herein, the term "substrate" includes any security document substrate into which a windowed security foil can be inserted or to which a security foil, a security patch, a hologram or an ink printed security feature can be applied. Security document substrates include without limitation, papers or other fibrous materials such as cellulose, paper-containing materials, plastics and polymers, composite materials and mixtures or combinations thereof. Typical paper, paper-like or other fibrous materials are made from a variety of fibers including without limitation abaca, cotton, linen, wood pulp, and blends thereof. As well known to those skilled in the art, cotton and cotton/linen blends are preferred for banknotes, while wood pulp is commonly used in non-banknote security documents. Typical examples of plastics and polymers include polyolefins, such as polyethylene (PE) and polypropylene (PP), polyamides, polyesters such as poly(ethylene terephthalate) (PET), poly(1,4-butylene terephthalate) (PBT), poly(ethylene 2,6-naphthoate) (PEN) and polyvinylchlorides (PVC). Typical examples of composite materials include without limitation multilayer structures or laminates of paper and at least one plastic or polymer material, such as those described hereabove. The substrate of the security document according to the present invention can be printed with any desired signs, including any symbols, images and patterns, and/or may include one or more security features other than windowed security threads, security foils, security patches, holograms and ink printed security features.

The security feature described herein is applied to a portion of the substrate (for e.g.: security foil, security patch, hologram, ink printed security feature) or inserted into a portion of the substrate (for e.g.: windowed security thread). The security foil, the security patch and the hologram described herein can be applied to a portion of the substrate by any known techniques including without limitation applying a pressure-sensitive adhesive to a surface of the security feature, applying a heat-activated adhesive to a surface of the security feature or using thermal transfer techniques. When the substrate is a paper, a paper-like material or other fibrous material, the security feature can be inserted into a portion of the substrate during manufacture by techniques commonly used in the paper-making industry. For example, the security feature described herein may be fed into a cylinder mold papermaking machine, cylinder vat machine, or other similar machine, resulting in partial embedment of the security feature within the body of the finished substrate so that the security feature has a surface facing away from the substrate. Moreover, the ink printed security feature described herein can be obtained by applying by inkjet, flexography, gravure or screen printing a suitable security ink to the substrate and subsequently curing said security ink by a suitable curing process.

As used herein, the terms "windowed security thread", "security foil", "security patch", "hologram" and "ink printed security feature" refer to a windowed security thread, a security foil, a security patch, a hologram and an ink printed security feature having a thickness of at least about 5 μm (micrometers). Preferably, the security feature described herein is selected from a windowed security thread, a security foil, a security patch and a hologram.

As well known to the skilled person, security threads, security foils and security patches are security features comprising several layers, including functional layers, such as optically variable layers, continuous or discontinuous metallized (i.e. demetallized) layers, magnetic layers, holographic layers and exhibiting striking optically variable effects and/or dynamic color shifts that are easily recognizable. Due to the multi-layer structure, the thickness of security threads, security foils and security patches is usually larger than 5 μm (micrometers).

Security threads are most often classified as public (i.e. 1$^{st}$ security level) security features i.e. security features that can be identified by the layperson without any technical knowledge or tools. Security threads provide 1$^{st}$ security level optical effects using color shifting inks, holography or lenticular structures, which can be verified in reflected light by tilting the object to observe the "movement" in the optical effect. A security thread can integrate further information, such as simple text or numeral values. Security threads are elongated security features, which are inserted into the security document substrate (for e.g.: banknote paper, both standard cotton paper and various combinations of cotton and synthetic fibers, banknote layered substrates, paper-based passports' visa pages) during its production. Security threads can be incorporated in the security substrate so that they are invisible in reflected light (so-called embedded thread), or periodically appearing and disappearing on one side of the security substrate (so-called windowed threads). As known to the skilled person and as used herein, "a windowed security thread" refers to a security thread, which is inserted into the substrate so that portions of one of the thread surfaces are visible on one surface of the substrate at different intervals (i.e. a surface of the security feature is facing away from the substrate). Preferably, the windowed security thread is selected from metallized threads, partially demetallized threads, hologram threads, lenticular threads and color-shifting threads. Generally, the dimension of a security thread in the longitudinal direction (i.e. the length) is more than twice as large as its dimension in the transverse direction (i.e. the width). A security thread has usually a width, i.e. dimension in the transverse direction, between about 1 mm and about 10 mm and a thickness ($t_f$) between about 10 and about 45 μm (micrometers).

Security foils are elongated security features, which are wider than threads, thereby offering more room for individual design. Security patches are smaller than security foils i.e. the dimension of a security patch in the longitudinal direction (i.e. the length) is significantly smaller than the dimension of a security foil in the longitudinal direction. Examples of security foils and security patches include without limitation metallized foils, partially demetallized foils, metallized patches, partially demetallized patches, hologram foils, hologram patches, lenticular foils, lenticular patches, color-shifting foils and color-shifting patches. Security foils and security patches generally have a thickness ($t_f$) of between about 5 and about 45 μm (micrometers). Security foils and security patches are applied by gluing or hot-stamping into the security documents substrate and have a surface facing away from the security document substrate.

Holograms are diffractive optically variable security features that can be integrated in security threads, security foils, security patches or applied directly by gluing or hot-stamping to security document substrates for e.g. as part of a window of a security document, such as a banknote. Holograms are multi-layered structure comprising a layer into which the hologram relief pattern is embossed, a reflective layer providing the hologram with its high diffraction efficiency. If the hologram is directly applied to a substrate, the hologram further comprises a protective layer ensuring that the reflective layer is not attacked by the adhesive layer required for applying the hologram to a substrate. The reflective layer generally consists of a vacuum-deposited metal, which can be aluminum or another metal (for e.g.: gold or chromium), or it consists of a transparent substance, such as titanium dioxide ($TiO_2$) or zinc sulfide (ZnS). In the latter case, the hologram will be semitransparent and derive its high reflection from the high refractive index of the oxide or sulfide. To obtain a see-through hologram, the metallic reflective layer of the multi-layered structure is selectively demetallized by methods known to the skilled person. A see-through hologram exhibits a reduced reflectivity by virtue of the removed metal, and a see-through characteristic, in that, if one lays this material over printed or photographic matter, one can see where the metal has been removed. As used herein, a hologram refers to a hologram having a thickness of between about 5 and about 15 μm (micrometers).

As used herein, the term "ink printed security feature" refers to a security feature having a thickness of at least about 5 μm (micrometers), which is obtained by printing by inkjet, flexography, gravure or screen printing on a security document a security ink comprising one or more security materials selected from magnetic pigments, UV absorbing pigments, IR absorbing pigments, optically variable pigments, light polarizing pigments, photoluminescent pigments, conductive pigments, surface-enhanced Raman spectroscopy particles and plasmon resonance particles, such as the platelet shaped transition metal particles described by WO2011064162A2, WO2013186167A2 and WO2014041121A1. European patent application number EP20171031.6 discloses examples of ink printed security features obtained with a security ink containing plasmon resonance particles.

The security feature described herein has a security feature thickness $t_f$ of at least 5 μm (micrometers) as determined for example by cross section observation on microscope. Generally, a windowed security thread has a thickness $t_f$ of between about 10 and about 45 μm, a security foil and a security patch have a thickness a thickness $t_f$ of between about 5 and about 45 μm, a hologram has a thickness $t_f$ of between about 5 and about 15 μm, while an ink printed security feature has a thickness $t_f$ of between about 5 and about 50 μm.

Figure 5:
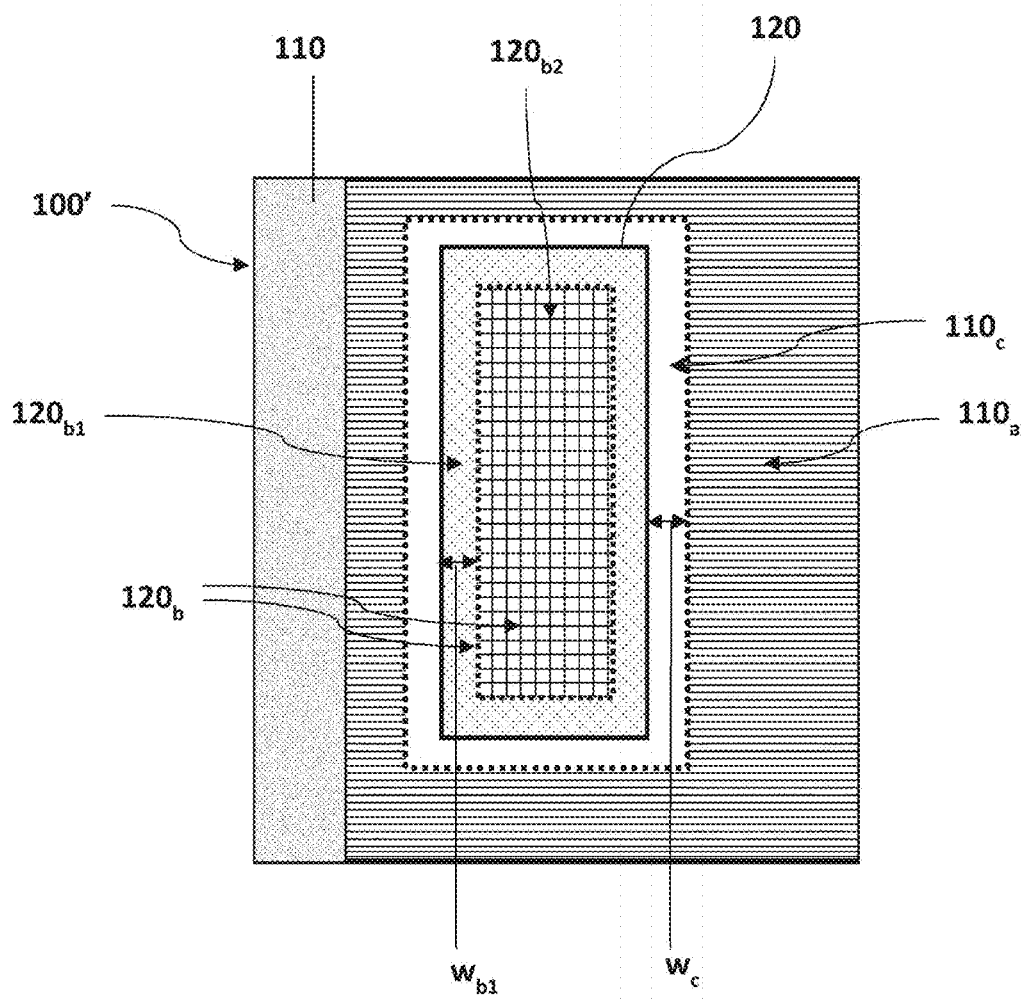
FIG. 5 schematically illustrates a top-view of a security document (100') to be provided at step a) of the inventive manufacturing method claimed herein.

As illustrated by FIG. 5 showing a top-view of an example of security document (100') to be provided at step a) of the manufacturing method claimed herein and comprising a substrate (110) to which a security feature (120) is applied or onto which a security feature (120) is inserted, the security feature (120) applied to or inserted to a portion of the substrate (110) has a surface ($120_b$) facing away from the substrate (110). The surface ($120_b$) of the security feature (120) facing away from the substrate (110) consists of a first region ($120_{b1}$—dotted pattern) adjacent to the edges of the security feature (120) and a second region ($120_{b2}$—grid pattern) non-adjacent to the edges of the security feature (120). The first region ($120_{b1}$—dotted pattern) adjacent to the edges of the security feature (120) will be covered by a transparent protective coating (130B) having a thickness $t_{b1}$, while the second region ($120_{b2}$—grid pattern) non-adjacent to the edges of the security feature (120) will be covered by a transparent protective coating (130B) having a thickness $t_{b2}$. As used herein "a first region adjacent to the edges of the security feature" refers to the region of the surface of the security feature facing away from the substrate, which is delimited by the edges of the security feature and has a width $w_{b1}$ of between about 0.5 and about 5 mm, preferably of between about 1 and about 4 mm, and more preferably of about 2 mm, wherein the width $w_{b1}$ is not necessarily constant along the entire first region. In FIG. 5, the first region adjacent to the edges of the security feature corresponds to the surface $120_{b1}$ having a dotted pattern design. As used herein "a second region non-adjacent to the edges of the security feature" refers to the region of the surface of the security feature facing away from the substrate, which is complementary to the first region i.e. the region of the security feature surface facing away from the substrate that is different from the first region. In FIG. 5, the second region non-adjacent to the edges of the security feature corresponds to the surface $120_{b2}$ having a grid pattern design.

As used herein "a first substrate surface adjacent to the edges of the security feature" refers to the substrate surface situated around the edges of the security feature and having a width $w_c$ of between about 0.5 and 5 mm, preferably of between about 1 and 4 mm, and more preferably of between about 2 and 3 mm, wherein the width $w_c$ is not necessarily constant along the entire first substrate surface. Thus, the transparent protective coating covering the security feature surface facing away from the substrate and the first substrate surface adjacent to the edges of the security feature is a continuous coating i.e. there are no coating-free regions on said surfaces exposing the surface of the security document to the external environment. In FIG. 5, the first substrate surface adjacent to the edges of the security feature corresponds to the pattern-free surface $110_c$, while the second substrate surface, which is different from the substrate surface covered by the security feature and the first substrate, surface corresponds to surface $110_a$ having a horizontal stripes pattern.

The security document according to the present invention may comprise on one of its sides a coating-free region of between about 5 and about 15% of the substrate surface, wherein the percentages are based on the total surface of the security document. Preferably, said coating-free region is present on at least one edge or corner of the substrate. The coating-free region may be used for example for numbering the security document. If the security document is a banknote, the coating-free region may be additionally used for adsorbing a staining (indelible) ink used for protecting banknotes against theft and robbery as described in the international patent application publication no. WO2013127715A2. The coating-free region may be situated on the same side of the security document as the security feature or on the opposite side of the security document.

Figure 4A:
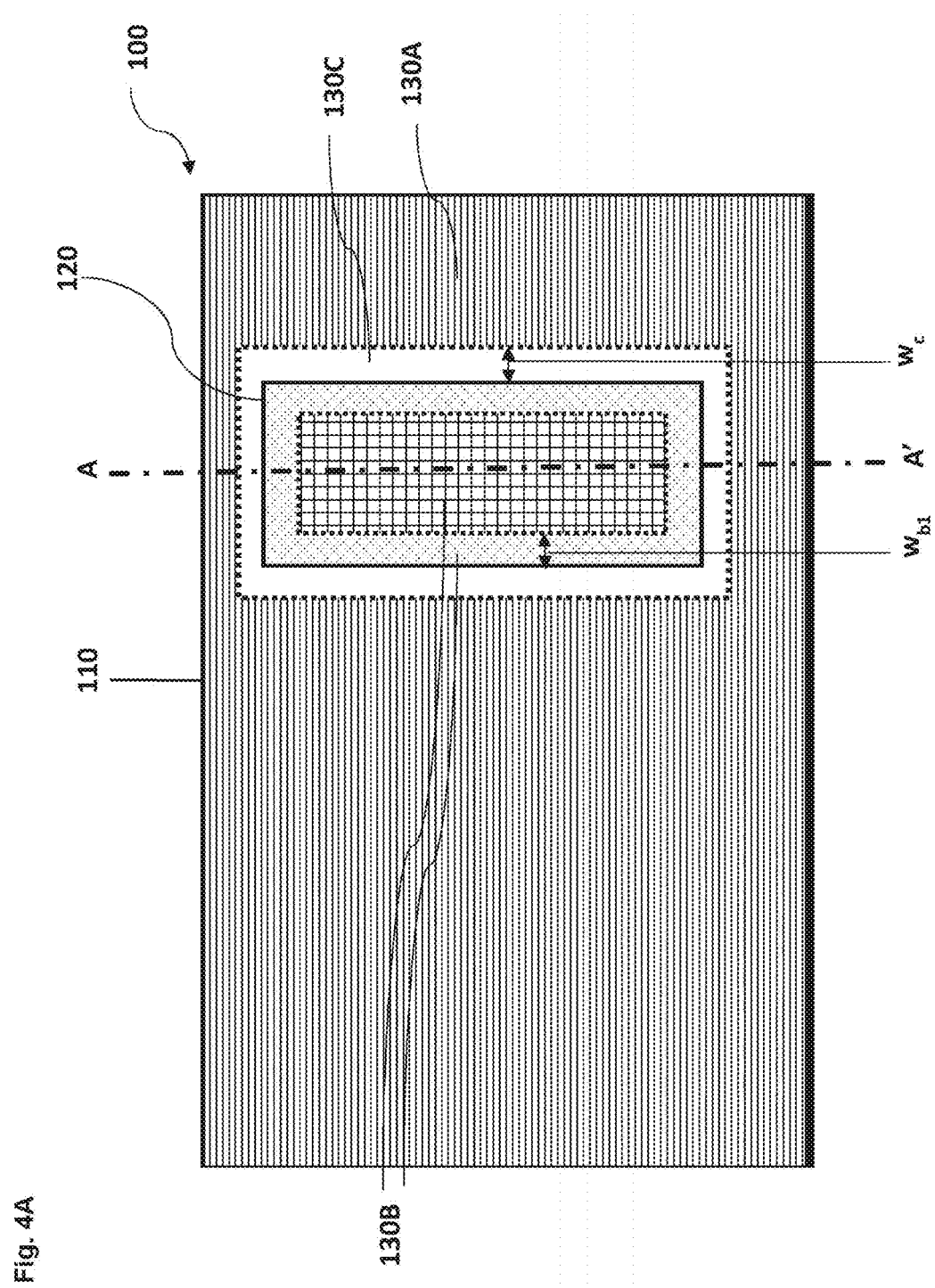
Figure 4B:
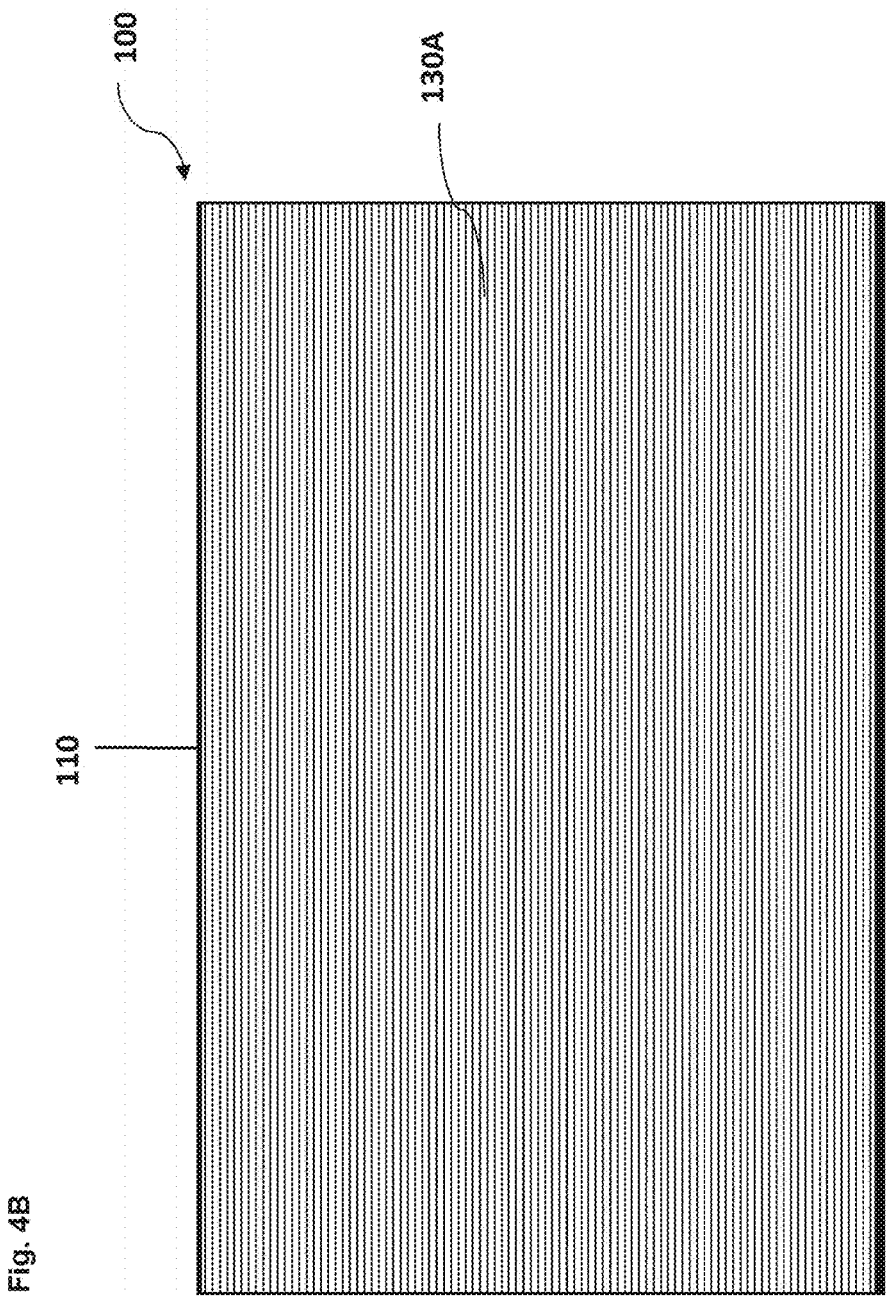

Preferably, the security document according to the present invention does not comprise a coating-free region i.e. the protective coating entirely covers both sides i.e. the front side and the back side of the security document. As illustrated by FIG. 4A and FIG. 4B in this case, the second substrate surface non-adjacent to the edges of the security document comprises the surface of the security document substrate on both sides of the security document other than the substrate surface covered by the security feature (120) and the first substrate surface.

For maintaining low-production costs and not affecting the mechanical properties of the security document, the thickness $t_a$ of the protective coating covering the second substrate surface is below about 5 μm, preferably between about 1 and 3 μm.

As used herein, a first thickness larger than a second thickness means that the first thickness is at least about 10% larger, preferably at least about 50% larger, more preferably at least about 100% larger, and even more preferably of at least about 200% larger than the second thickness, wherein both thicknesses are determined by cross section observation on microscope. Thus, if the security feature selected from a windowed security thread, a security foil, a security patch, a hologram and an ink printed security feature has a thickness $t_f$ of about 10 µm, then the thickness $t_c$ of the transparent protective coating covering the first substrate surface is of at least 11 µm, preferably of at least 15 µm, more preferably of at least about 20 µm, and more preferably of at least about 30 µm. Further, if for example the thickness $t_a$ of the protective coating covering the second substrate surface is of about 2 µm, then the thickness $t_{b2}$ of the transparent protective coating covering the second region of the security feature is of at least about 2.2 µm, preferably of at least about 3 µm, more preferably of at least about 4 µm, and even more preferably of at least about 6 µm, such as for example about 7 µm.

Preferably, the ratio between the thickness $t_c$ of the transparent protective coating covering the first substrate surface and the thickness $t_f$ of the security feature is comprised between about 1.1 and about 4, more preferably between about 1.5 and about 3, and more preferably between about 2 and about 3. Security documents characterized by such protective coating thicknesses exhibit excellent chemical resistance.

A preferred embodiment according to the present invention is directed to a security document as described herein wherein the thickness $t_c$ of the transparent protective coating covering the first substrate surface is larger than or equal to the sum of the thickness of the security feature $t_f$ and the thickness $t_{b2}$ of the transparent protective coating covering the second region of the security feature ($t_c \geq t_f + t_{b2}$).

A further embodiment according to the present invention relates to a security document as described herein, wherein the portion of the substrate to which the security feature is applied is a transparent polymer. By applying a security foil, a security patch, a hologram or an ink printed security feature to a transparent polymer substrate, the security document can be equipped with a secure transparent window i.e. one of the most advanced security features, which is easy to recognize and extremely difficult to counterfeit since windows reprographic reproduction results in black windows and the production process is exclusive to security documents production and is not available in commercial print and paper technology. To avoid impairing the properties of the security feature carried by such security document, the surface of the transparent polymer portion that is opposite to the surface of the transparent polymer portion to which the security feature is applied should not be covered by a protective coating.

In an embodiment according to the present invention, the transparent protective coating covering the security feature surface facing away from the substrate and the first substrate surface and the protective coating covering the second substrate surface are each obtained from a different curable varnish i.e. the transparent protective coating covering the security feature surface facing away from the substrate and the first substrate surface and the protective coating covering the second substrate surface are obtained from two different curable varnishes. Preferably, the transparent protective coating covering the security feature surface facing away from the substrate and the first substrate surface consists of a single layer obtained from a first curable varnish. The single transparent coating layer extending over or covering the entire security feature surface facing away from the substrate and the entire first substrate surface and presenting a variable thickness with a coating thickness $t_c$ on the first substrate surface larger than the thickness $t_f$ of the security feature and larger than or equal to the coating thickness $t_{b1}$ on the first region of the security feature, and preferably with a coating thickness $t_c$ on the first substrate surface larger than or equal to the sum of the thickness of the security feature $t_f$ and the coating thickness $t_{b2}$ on the second region of the security feature, provides increased chemical resistance to the security document according to the present invention when compared to the security documents presenting a constant coating layer according to the prior art. Advantageously, the protective coating covering the second substrate surface is a matt lacquer and/or the transparent protective coating covering the security Feature surface facing away from the substrate and the first substrate surface is a glossy lacquer. In other words, the protective coating covering the second substrate surface is obtained from a first curable varnish (for e.g. the radiation curable varnishes C1-C10, E1, E2 as described in the international patent application publication no. WO2014067715A1), which following curing provides a matt protective coating and/or the transparent protective coating covering the security feature surface facing away from the substrate and the first substrate surface is obtained from a second curable varnish (for e.g.: the curable varnish according to Table 1 below), which following curing provides a glossy transparent protective coating. To facilitate the security documents storing, stacking and grasping, in particular banknotes storing, stacking and grasping, the protective coating covering the second substrate surface is preferably a matt lacquer, which provides a better grip. Moreover, a matt lacquer has the advantage of retaining the users' accustomed perception of security documents by the sense of touch, and causes much less reflection than a glossy lacquer, thereby enabling machine checking and authentication of security documents with the optical sensors customarily used. As a matt protective lacquer, and especially a thick matt lacquer impairs the optical properties of a security feature, such as a windowed security thread, a security foil, a security patch, a hologram and an ink printed security feature, by reducing its brilliance and rendering its appearance hazy, such matt lacquer should not be used for protecting the security feature surface facing away from the substrate and the first substrate surface adjacent to the edges of the security feature. Hence, the transparent protective coating covering the security feature surface facing away from the substrate and the first substrate surface adjacent to the edges of the security feature is preferably a glossy lacquer, which is free of components having a light scattering effect, such as for e.g. fillers. A glossy lacquer is conspicuous and draws the layperson's attention to the security feature covered by the glossy lacquer, thereby aiding the unexperienced users to easily find the security feature on the security document.

A further preferred embodiment according to the present invention is directed to a security document as described herein, wherein the transparent protective coating covering the security feature surface facing away from the substrate and the first substrate surface comprises two different layers and one of the two different layers the same thickness $t_a$ as the transparent protective coating covering the second substrate surface and is obtained from the same curable varnish as the transparent protective coating covering the second substrate surface.

In an alternative still preferred embodiment according to the present invention, the protective coating covering the security feature surface facing away from the substrate, the first substrate surface adjacent to the edges of the security feature and the second substrate surface, which is different from the substrate surface covered by the security feature and the first substrate surface, consists of a single layer. In such case the protective coating on the different surfaces of the security document is transparent and is obtained from the same curable varnish, preferably a radiation curable varnish and more preferably a UV-curable varnish.

Preferably, the inventive security document claimed herein is obtained by a manufacturing method comprising the following steps:
  a) providing a security document comprising:
      a substrate,
      a security feature applied to or inserted into a portion of the substrate, wherein the security feature is selected from a windowed security thread, a security foil, a security patch, a hologram and an ink printed security feature, has a security feature thickness $t_f$ of at least 5 µm (micrometers) and a security feature surface facing away from the substrate consisting of a first region adjacent to the edges of the security feature and a second region non-adjacent to the edges of the security feature;
  b) inkjet printing a radiation curable varnish on the security feature surface facing away from the substrate and a first substrate surface adjacent to the edges of the security feature, wherein the varnish deposit on the first substrate surface is equal to or higher than the varnish deposit on the first region adjacent to the edges of the security feature, and the varnish deposit on the first region is equal to or higher than, preferably higher than, the varnish deposit on the second region; and
  c1) printing by offset or flexography a curable varnish on a second substrate surface, which is different from the substrate surface covered by the security feature and the first substrate surface, and optionally on the security feature surface facing away from the substrate and the first substrate surface;
  or
  c2) inkjet printing a radiation curable varnish on a second substrate surface, which is different from the substrate surface covered by the security feature and the first substrate surface;
  and
  d) curing the curable varnishes to provide a protective coating covering the security feature surface facing away from the substrate, the first substrate surface and the second substrate surface;
    wherein the varnish deposit on the second region is higher than the varnish deposit on the second substrate surface.

It is within the common general knowledge of the person skilled in the art of printing technologies, taking into account the printing process including the printing technique (for e.g.: inkjet, offset, flexography) and the parameters characteristic to that specific technique, such as ink properties (for e.g.: viscosity, surface tension) and process variables (for e.g.: resolution (dpi), blanket hardness, cell and depth of anilox gravure) to choose the varnish deposits so that following the curing step d) the thickness $t_c$ of the transparent protective coating covering the first substrate surface is larger than the thickness $t_f$ of the security feature, which is larger than the thickness $t_a$ of the protective coating covering the second substrate surface ($t_c > t_f > t_a$), the thickness $t_{b2}$ of the transparent protective coating covering the second region of the security feature is larger than the thickness $t_a$ of the protective coating covering the second substrate surface ($t_{b2} > t_a$), and either the thickness $t_c$ of the transparent protective coating covering the first substrate surface is larger than the thickness $t_{b1}$ of the transparent protective coating covering the first region of the security feature, which is larger than or equal to the thickness $t_{b2}$ of the transparent protective coating covering the second region of the security feature ($t_c > t_{b1} \geq t_{b2}$), or the thickness $t_c$ of the transparent protective coating covering the first substrate surface is equal to the thickness $t_{b1}$ of the transparent protective coating covering the first region of the security feature, which is larger than the thickness $t_{b2}$ of the transparent protective coating covering the second region of the security feature ($t_c = t_{b1} > t_{b2}$).

As well known in the art, the term "varnish deposit" (g/m$^2$) refers to the quantity of varnish in grams applied by m$^2$ of surface. As used herein, a first varnish deposit higher than a second varnish deposit means that the first varnish deposit is at least about 10% higher, preferably at least about 50% higher, more preferably at least about 100% higher, and even more preferably of at least about 200% higher than the second varnish deposit.

A further aspect according to the present invention is directed to a method of manufacturing the security document claimed herein comprising the following steps:
  a) providing a security document comprising:
      a substrate,
      a security feature applied to or inserted into a portion of the substrate, wherein the security feature is selected from a windowed security thread, a security foil, a security patch, a hologram and an ink printed security feature, has a security feature thickness $t_f$ of at least 5 µm (micrometers) and a security feature surface facing away from the substrate consisting of a first region adjacent to the edges of the security feature and a second region non-adjacent to the edges of the security feature;
  b) inkjet printing a radiation curable varnish on the security feature surface facing away from the substrate and a first substrate surface adjacent to the edges of the security feature, wherein the varnish deposit on the first substrate surface is equal to or higher than the varnish deposit on the first region adjacent to the edges of the security feature, and the varnish deposit on the first region is equal to or higher than, preferably higher than, the varnish deposit on the second region; and
  c1) printing by offset or flexography a curable varnish on a second substrate surface, which is different from the substrate surface covered by the security feature and the first substrate surface, and optionally on the security feature surface facing away from the substrate and the first substrate surface;
  or
  c2) inkjet printing a radiation curable varnish on a second substrate surface, which is different from the substrate surface covered by the security feature and the first substrate surface;
  and
  d) curing the curable varnishes to provide a protective coating covering the security feature surface facing away from the substrate, the first substrate surface and the second substrate surface;
    wherein the varnish deposit on the second region is higher than the varnish deposit on the second substrate surface.

A non-limiting example of a security document (100') to be provided at step a) of the manufacturing method claimed herein is depicted by FIG. 5 showing a top-view of such a security document. The security document (100') comprises a substrate (110) to which a security feature (120) is applied or onto which a security feature (120) is inserted by methods known in the art, wherein the security feature (120) has a surface (120$_b$) facing away from the substrate (110) consisting of a first region ($120_{b1}$—dotted pattern) adjacent to the edges of the security feature (120) and a second region ($120_{b2}$—grid pattern) non-adjacent to the edges of the security feature (120). The substrate surface comprises a first substrate surface ($110_c$) adjacent to the edges of the security feature (120) and a second substrate surface ($110_a$—horizontal stripes pattern), which is different from the substrate surface covered by the security feature (120) and the first substrate surface ($110_c$). Different varnish deposits will be printed on the different surfaces ($110_a$, $110_c$, $120_{b1}$, $120_{b2}$) of the substrate (110) and of the security feature (120) by conducting either steps b) and c1), or steps b) and c2) of the manufacturing method claimed herein.

The term "curing" or "curable" refers to processes including the drying or solidifying, reacting or polymerization of the applied varnish in such a manner that it can no longer be removed from the surface onto which it is applied. Examples of curing mechanisms comprise physical curing (e.g. removal of volatile components, such as solvents, by heating, penetration) and chemical curing (e.g. polymerization, oxidation), or a combination of physical and chemical curing (e.g.; removal of volatile components, followed by polymerization).

As used herein, the term "a curable varnish" encompasses an oxidatively curable varnish, a thermally curable varnish, a radiation curable varnish or a combination thereof (for e.g.: a varnish having a composition similar to a radiation curable varnish, but including a volatile part constituted by water or by a solvent and which is cured by evaporation of the volatile part by using hot air or an IR drier, followed by UV curing or EB curing so that to complete the hardening process), which is suitable to be printed by inkjet, offset or flexography.

Oxidatively curable varnishes are cured by oxidation in the presence of oxygen, in particular in the presence of the atmospheric oxygen. During the curing process, the oxygen combines with one or more components of the varnish, thereby converting the varnish to a solid state. The process may be accelerated by the use of driers (also referred in the art as catalysts, siccative agents, desiccatives or dessicators) such as for example inorganic or organic salts of metal(s), metallic soaps of organic acids, metal complexes and metal complex salts, optionally with the application of a thermal treatment, which are preferably present in an amount from about 0.01 to about 10 wt-%, more preferably in an amount from about 0.1 to about 5 wt-%, the weight percents being based on the total weight of the oxidatively curable varnish. The one or more driers include without limitation polyvalent salts containing cobalt, calcium, copper, zinc, iron, zirconium, manganese, barium, zinc, strontium, lithium, vanadium and potassium as the cation(s), and halides, nitrates, sulfates, carboxylates like acetates, ethylhexanoates, octanoates and naphtenates or acetoacetonates as the anion(s). Preferably, the one or more driers are selected from the group consisting of ethylhexanoates or octanoates of manganese, cobalt, calcium, strontium, zirconium, zinc and mixtures thereof.

The oxidatively curable varnish further comprises one or more polymers comprising unsaturated fatty acid residues, saturated fatty acids residues and mixtures thereof, as generally known in the art. The one or more polymers are present in an amount from about 10 to about 90 wt-%, the weight percents being based on the total weight of the oxidatively curable varnish. Preferably, the one or more polymers comprise unsaturated fatty acid residues to ensure the air drying properties. However, the one or more polymers may also comprise saturated fatty acids residues. The one or more polymers may be selected from the group consisting of alkyd resins, vinyl polymers, polyurethane resins, hyperbranched resins, rosin-modified maleic resins, rosin-modified phenol resins, rosin ester, petroleum resin-modified rosin ester, petroleum resin-modified alkyd resin, alkyd resin-modified rosin/phenol resin, alkyd resin-modified rosin ester, acrylic-modified rosin/phenol resin, acrylic-modified rosin ester, urethane-modified rosin/phenol resin, urethane-modified rosin ester, urethane-modified alkyd resin, epoxy-modified rosin/phenol resin, epoxy-modified alkyd resin, terpene resins nitrocellulose resins, polyolefins, polyamides, acrylic resins and combinations or mixtures thereof. Polymers and resins are herein interchangeably used.

Saturated and unsaturated fatty acid compounds may be obtained from natural and/or artificial sources. Natural sources include animal sources and/or plant sources. Animal sources may comprise animal fat, butter fat, fish ail, lard, liver fats, tuna fish oil, sperm whale oil and/or tallow oil and waxes. Plant sources may comprise waxes and/or oils such as vegetable oils and/or non-vegetable oils. Examples of plant oils include without limitation bitter gourd, borage, calendula, canola, castor, china wood, coconut, conifer seed, corn, cottonseed, dehydrated castor, flaxseed, grape seed, Jacaranda mimosifolia seed, linseed oil, palm, palm kernel, peanut, pomegranate seed, rapeseed, safflower, snake gourd, soya (bean), sunflower, tall, tung and wheat germ. Artificial sources include synthetic waxes (such as micro crystalline and/or paraffin wax), distilling tail oil and/or chemical or biochemical synthetic methods. Suitable fatty acids also include (Z)-hexadan-9-enoic[palmitoleic]acid ($C_{16}H_{30}O_2$), (Z)-octadecan-9-enoic[oleic]acid ($C_{18}C_{34}O_2$), (9Z,11E,13E)-octadeca-9,11,13-trienoic[a-eleostearic]acid ($C_{18}H_{30}O_2$), licanic acid, (9Z,12Z)-octadeca-9,12-dienoic [linoeic]acid ($C_{18}H_{32}O_2$), (5Z, 8Z,11Z,14Z)-eicosa-5,8,11,14-tetraenoic[arachidonic]acid ($C_{20}H_{32}O_2$), 12-hydroxy-(9Z)-octadeca-9-enoic[ricinoleic]acid ($C_{18}H_{34}O_3$), (Z)-docosan-13-enoic[erucic]acid ($C_{22}H_{42}O_3$), (Z)-eicosan-9-enoic[gadoleic]acid ($C_{20}H_{38}O_2$), (7Z,10Z,13Z,16Z,19Z)-docosa-7,10,13,16,19-pentaenoic[clupanodonic]acid and mixtures thereof.

Further examples of suitable fatty acids are ethylenicaily unsaturated conjugated or non-conjugated $C_2$-$C_{24}$ carboxylic acids, such as myristoleic, paimitoleic, arachidonic, erucic, gadoleic, clupanadonic, oleic, ricinoleic, linoleic, linolenic, licanic, nisinic acid and eleostearic acids or mixtures thereof. Those fatty acids are typically used in the form of mixtures of fatty acids derived from natural or synthetic oils.

The oxidatively curable varnish may further comprise one or more antioxidants, such as those known by people skilled in the art. Suitable antioxidants include without limitation alkyl phenols, hindered alkyl phenols, alkyithiomethyl-phenols, eugenol, secondary amines, thioether, phosphites, phosphonites, dithiocarbamates, gallates, malonates, propionates, acetates and other esters, carboxamides, hydroquinones, ascorbic acid, triazines, benzyl compounds as well as tocopherols and analogue terpenes. Such antioxidants are commercially available for example from the sources disclosed in the international patent application publication no. WO02100960A1. Hindered alkyl phenols are phenols having at least one or two alkyl groups ortho to the phenolic hydroxyl. One, preferably both, alkyl groups ortho to the phenolic hydroxyl are preferably secondary or tertiary alkyl, more preferably tertiary alkyl, especially Cert-butyl, Cert-amyl or 1,1,3,3-tetramethylbutyl. Preferred antioxidants are hindered alkyl phenols and especially, 2-tert-butyl-hydroquinone, 2,5-di-tert-butyl-hydroquinone, 2-tert-butyl-p-cresol and 2,6-di-tert-butyl-p-cresol. When present, the one or more antioxidants are present in an amount from about 0.05 to about 3 wt-%, the weight percents being based on the total weight of the oxidatively curable varnish.

The oxidatively curable varnish described herein may further comprise one or more waxes preferably selected from the group consisting of synthetic waxes, petroleum waxes and natural waxes. Preferably, the one or more waxes are selected from the group consisting of microcrystalline waxes, paraffin waxes, polyethylene waxes, fluorocarbon waxes, polytetrafluoroethylene waxes, Fischer-Tropsch waxes, silicone fluids, beeswaxes, candelilla waxes, montan waxes, carnauba waxes and mixtures thereof. When present, the one or more waxes are preferably present in an amount from about 0.1 to about 15 wt-%, the weight percents being based on the total weight of the oxidatively curable varnish.

The oxidatively curable varnish may further comprise one or more fillers and/or extenders preferably selected from the group consisting of carbon fibers, talcs, micas (e.g. muscovites), wollastonites, calcinated clays, china clays, kaolins, carbonates (e.g. calcium carbonate, sodium aluminum carbonate), silicates (e.g. magnesium silicate, aluminum silicate), sulfates (e.g. magnesium sulfate, barium sulfate), titanates (e.g. potassium titanate), alumina hydrates, silica, fumed silica, montmorillonites, graphites, anatases, rutiles, bentonites, vermiculites, zinc whites, zinc sulfides, wood flours, quartz flours, natural fibers, synthetic fibers and combinations thereof. When present, the one or more fillers or extenders are preferably present in an amount from about 0.1 to about 40 wt-%, the weight percents being based on the total weight of the oxidatively curable varnish.

As used herein, the term "a thermally curable varnish" includes any water-based varnish and any solvent-based varnish, which is curable by cold air, hot air, infrared or a combination thereof. Usually, a thermally curable varnish comprises 50 to 85-wt % water, organic solvent or mixture thereof, which is evaporated during the curing.

Typically, a thermally curable varnish comprises components including without limitation resins such as polyester resins, polyether resins, vinyl chloride polymers and vinyl chloride based copolymers, nitrocellulose resins, cellulose acetobutyrate or acetopropionate resins, maleic resins, polyamides, polyolefins, polyurethane resins, functionalized polyurethane resins (e.g. carboxylated polyurethane resins), polyurethane alkyd resins, polyurethane-(meth)acrylate resins, urethane-(meth)acrylic resins, styrene (meth)acrylate resins or mixtures thereof. The term "(meth)acrylate" or "(meth)acrylic" refers to the acrylate as well as the corresponding methacrylate or refers to the acrylic, as well as the corresponding methacrylic.

As used herein, the term "water-based varnish" refers to an aqueous dispersion containing components including without limitation resins having an ester bond (e.g. polyester resins, polyether resins), polyurethane resins, polyurethaneaikyd resins, polyurethane resins (e.g.: carboxylated polyurethane resins), polyurethane alkyd resins, polyurethane-acrylate resins, urethane-acrylic resins, polyetherurethane resins, styrene acrylate resins or mixtures thereof.

As used herein, the term "solvent-based varnish" refers to varnishes whose liquid medium or carrier substantially consists of one or more organic solvents. Examples of such solvents include without limitation alcohols (such as for example methanol, ethanol, isopropanol, n-propanol, ethoxy propanol, n-butanol sec-butanol, tert-butanol, iso-butanol, 2-ethylhexyl-alcohol and mixtures thereof); polyols (such as for example glycerol, 1,5-pentanedial, 1,2,6-hexanetriol and mixtures thereof); esters (such as for example ethyl acetate, n-propyl acetate, n-butyl acetate and mixtures thereof); carbonates (such as for example dimethyl carbonate, diethylcarbonate, di-n-butylcarbonate, 1,2-ethylencarbonate, 1,2-propylenecarbonate, 1,3-propylencarbonate and mixtures thereof); aromatic solvents (such as for example toluene, xylene and mixtures thereof); ketones and ketone alcohols (such as for example acetone, methyl ethyl ketone, methyl isobutyl ketone, cyclohexanone, diacetone alcohol and mixtures thereof); amides (such as for example dimethylformamide, dimethyl-acetamide and mixtures thereof); aliphatic or cycloaliphatic hydrocarbons; chlorinated hydrocarbons (such as for example dichloromethane); nitrogen-containing heterocyclic compound (such as for example N-methyl-2-pyrrolidone, 1,3-dimethyl-2-imid,azolidone and mixtures thereof); ethers (such as for example diethyl ether, tetrahydrofuran, dioxane and mixtures thereof); alkyl ethers of a polyhydric alcohol (such as for example 2-methoxyethanol, 1-methoxypropan-2-ol and mixtures thereof); alkylene glycols, alkylene thioglycols, polyalkylene glycols or polyalkylene thioglycols (such as for example ethylene glycol, polyethylene glycol (such as for example diethylene glycol, triethylene glycol, tetraethylene glycol), propylene glycal polypropylene glycol (such as for example dipropylene glycol, tripropylene glycol), butylene glycol, thiodiglycol, hexylene glycol and mixtures thereof); nitriles (such as for example acetonitrile, propionitnie and mixtures thereof), and sulfur-containing compounds (such as for example dimethylsulfoxide, sulfolan and mixtures thereof). Preferably, the one or more organic solvents are selected from the group consisting of alcohols, esters and mixtures thereof.

In a preferred embodiment, the curable varnish used in the present invention is a radiation curable varnish. As well known to the skilled person, the term "a radiation curable varnish" encompasses varnishes that may be cured by UV-visible light radiation (hereafter referred as UV-Vis-curable) or by electron beam radiation (hereafter referred as EB). Radiation curing advantageously leads to very fast curing processes and hence, drastically decreases the manufacturing time of security documents comprising transparent protective coatings obtained from radiation curable varnishes. Radiation curable compositions are known in the art and can be found in standard textbooks such as the series "Chemistry & Technology of UV & EB Formulation for Coatings, Inks & Paints", published in 7 volumes in 1997-1998 by John Wiley & Sons in association with SITA Technology Limited.

Preferably, the radiation curable varnish is a UV-Vis light curable varnish comprising monomers (i.e. prepolymers) and oligomers (i.e. prepolymers) selected from radically curable compounds, cationicaily curable compounds and mixtures of radically and cationically curable compounds.

Radically curable compounds are cured by free radical mechanisms consisting of the activation by energy of one or more photoinitiators, which liberate free radicals that in turn initiate the polymerization so as to form the coating. Preferably, the radically curable compounds are selected from (meth)acrylates, preferably selected from the group consisting of epoxy (meth)acrylates, (meth)acrylated oils, polyester and polyether (meth)acrylates, aliphatic or aromatic urethane (meth)acrylates, silicone (meth)acrylates, acrylic (meth)acrylates and mixtures thereof. The term "(meth)acrylate" refers to the acrylate as well as the corresponding methacrylate.

Cationically curable compounds are cured by cationic mechanisms consisting of the activation by energy of one or more photoinitiators, which liberate cationic species, such as acids, which in turn initiate the polymerization of the compound so as to form the coating. Preferably, the one or more cationically curable compounds are selected from the group consisting of vinyl ethers, propenyl ethers, cyclic ethers such as epoxides, oxetanes, and tetrahydrofuranes, lactones, cyclic thioethers, vinyl thioethers, propenyl thioethers, hydroxyl-containing compounds and mixtures thereof, preferably cationically curable compounds selected from the group consisting of vinyl ethers, propenyl ethers, cyclic ethers such as epoxides, oxetanes and tetrahydrofuranes, lactones, and mixtures thereof.

UV-Vis curing of a monomer, oligomer or prepolymer requires the presence of one or more photoinitiators and may be achieved in a number of ways. As known by those skilled in the art, the one or more photoinitiators are selected according to their absorption spectra and are selected to fit with the emission spectra of the radiation source. Depending on the monomers, oligomers or prepolymers used to prepare the radiation curable varnish, different photoinitiators might be used.

Suitable examples of cationic photoinitiators are known to those skilled in the art and include without limitation onium salts, such as organic iodonium salts (e.g. diaryl iodoinium salts), oxonium (e.g. triaryloxonium salts) and sulphonium salts (e.g. triarylsulphonium salts).

Suitable examples of free radical photoinitiators are known to those skilled in the art and include without limitation acetophenones, benzophenones, alpha-aminoketones, alpha-hydroxyketones, phosphine oxides and phosphine oxide derivatives and benzyldimethyl ketals. Other examples of useful photoinitiators can be found in standard textbooks such as "Chemistry & Technology of UV & ER Formulation for Coatings, Inks & Paints", Volume III, "Photoinitiators for Free Radical Cationic and Anionic Polymerization", 2nd edition, by J. V. Crivello & K. Dietliker, edited by G. Bradley and published in 1998 by John Wiley & Sons in association with SITA Technology Limited.

Inkjet printing consists of continuous inkjet (CIJ) printing and drop-on-demand (DOD) inkjet printing.

In the manufacturing methods described herein, the use of DOD inkjet printing is preferred, Drop-on-demand (DOD) printing is a non-contact printing process, wherein the droplets are only produced when required for printing, and generally by an ejection mechanism rather than by destabilizing a jet. Depending on the mechanism used in the printhead to produce droplets, the DOD printing is divided in piezo impulse, thermal jet and valve jet. To be suitable for DOD inkjet printing, the radiation curable varnish must have low viscosity of less than about 20 cP at jetting temperature and a surface tension lower than about 45 N/m.

Offset printing processes consist of indirect methods, wherein the curable varnish is transferred from a printing plate to a blanket cylinder and then said curable varnish is transferred onto a substrate. Accordingly, the blanket cylinder is varnished by the printing plate. Offset printing takes advantage of the surface energy difference between the image area and the non-image area of the printing plate. The image area is oleophilic, whereas the non-image area is hydrophilic. Thus, the oily curable varnishes used in the method tend to adhere to the image-area and to be repelled from the non-image area of the printing plate. Wet offset printing is typically carried out by feeding both a fountain solution (also referred in the at as dampening solution) and an oleophilic curable varnish to the printing plate to allow the image areas to receive preferentially the curable varnish and the non-image areas preferentially the fountain solution and then transferring the curable varnish deposited on image areas onto a substrate.

To be suitable to be printed by offset, the curable varnish must have a viscosity in the range of about 2.5 to about 25 Pa s at 40° C. and 1000 s$^{-1}$, the viscosities being measured on a Haake Roto-Visco RV1 with a cone 2 cm 0.5°.

Flexography printing preferably uses a unit with a doctor blade, preferably a chambered doctor blade, an anilox roller and plate cylinder. The anilax roller advantageously has small cells whose volume and/or density determines the curable varnish, application rate. The doctor blade lies against the anilox roller, and scraps off varnish surplus at the same time. The anilox roller transfers the varnish to the plate cylinder, which finally transfers the varnish to the substrate, Specific design might be achieved using a designed photopolymer plate. Plate cylinders can be made from polymeric or elastomeric materials. Polymers are mainly used as photopolymer in plates and sometimes as a seamless coating on a sleeve. Photopolymer plates are made from light-sensitive polymers that are hardened by ultraviolet (UV) light. Photopolymer plates are cut to the required size and placed in an UV light exposure unit. One side of the plate is completely exposed to UV light to harden or cure the base of the plate. The plate is then turned over, a negative of the job is mounted over the uncured side and the plate is further exposed to UV light. This hardens the plate in the image areas. The plate is then processed to remove the unhardened photopolymer from the nonimage areas, which lowers the plate surface in these nonimage areas. After processing, the plate is dried and given a post-exposure dose of UV light to cure the whole plate. Preparation of plate cylinders for flexography is described in *Printing Technology*, J. M. Adams and P. A. Dolin, Delmar Thomson Learning, 5th Edition, pages 359-360.

To be suitable to be printed by flexography, the curable varnish must have a viscosity in the range of about 0.01 to about 1 Pa s at 25° C. and 1000 s$^{-1}$ using a rotational viscosimeter DHR-2 from TA instruments (cone-plane geometry, diameter 40 mm). Example of curable varnishes to be printed by flexography are described in the international patent application publication no. WO2014067715A1.

The manufacturing method claimed and described herein enables the selective application in one printing pass of different varnish deposits on different surfaces of a security document, including the front and back side of a security document, thereby providing security documents with increased chemical and physical resistance. The methods of applying a protective varnish on a security document according to the prior art are based on the exclusive use of flexography or screen printing, and consequently, manufacturing security documents with variable coating thickness with said methods would require an extensive number of printing stations, leading to complicated, expensive and time-consuming manufacturing methods. As steps b), c1) or c2), and d) are conducted in one printing pass and maximum two printing stations, the manufacturing method claimed herein overcomes said drawbacks. Further, as the inventive manufacturing method described herein enables the application of large varnish deposits selectively on the first substrate surface, which is adjacent to the edges of the security features and on the first region of the security feature surface facing away from the substrate, the manufacturing method claimed herein remains cost-efficient.

In a preferred embodiment according to the present invention the step c1) i.e. printing by offset or flexography a curable varnish on a second substrate surface, which is different from the substrate surface covered by the security feature and the first substrate surface, and optionally on the security feature surface facing away from the substrate and the first substrate surface is conducted before step b). Hence, a further embodiment according to the present invention is directed to a manufacturing method comprising the steps of:

a) providing a security document comprising:
   a substrate,
   a security feature applied to or inserted into a portion of the substrate, wherein the security feature is selected from a windowed security thread, a security foil, a security patch, a hologram and an ink printed security feature, has a security feature thickness $t_f$ of at least 5 μm (micrometers) and a security feature surface facing away from the substrate consisting of a first region adjacent to the edges of the security feature and a second region non-adjacent to the edges of the security feature;

c1) after step a) printing by offset or flexography a curable varnish on a second substrate surface, which is different from the substrate surface covered by the security feature and the first substrate surface, and optionally on the security feature surface facing away from the substrate and the first substrate surface;

b) after step c1) inkjet printing a radiation curable varnish on the security feature surface facing away from the substrate and a first substrate surface adjacent to the edges of the security feature, wherein the varnish deposit on the first substrate surface is equal to or higher than the varnish deposit on the first region adjacent to the edges of the security feature, and the varnish deposit on the first region is equal to or higher than, preferably higher than, the varnish deposit on the second region; and d) after step b) curing the curable varnishes to provide a protective coating covering the security feature surface facing away from the substrate, the first substrate surface and the second substrate surface;

wherein the varnish deposit on the second region is higher than the varnish deposit on the second substrate surface.

An alternative embodiment according to the present invention relates to a manufacturing method as described herein wherein step b) i.e. inkjet printing a radiation curable varnish on the security feature surface facing away from the substrate and a first substrate surface adjacent to the edges of the security feature, wherein the varnish deposit on the first substrate surface is equal to or higher than the varnish deposit on the first region adjacent to the edges of the security feature, and the varnish deposit on the first region is equal to or higher than, preferably higher than, the varnish deposit on the second region is conducted before step c1) and the manufacturing method further comprises step a) conducted between steps b) and c1):

e) at least partially curing the radiation curable varnish printed at step b).

Hence, a further embodiment according to the present invention is directed to a manufacturing method comprising the steps of:

a) providing a security document comprising:
   a substrate,
   a security feature applied to or inserted into a portion of the substrate, wherein the security feature is selected from a windowed security thread, a security foil, a security patch, a hologram and an ink printed security feature, has a security feature thickness $t_f$ of at least 5 μm (micrometers) and a security feature surface facing away from the substrate consisting of a first region adjacent to the edges of the security feature and a second region non-adjacent to the edges of the security feature;

b) after step a) inkjet printing a radiation curable varnish on the security feature surface facing away from the substrate and a first substrate surface adjacent to the edges of the security feature, wherein the varnish deposit on the first substrate surface is equal to or higher than the varnish deposit on the first region adjacent to the edges of the security feature, and the varnish deposit on the first region is equal to or higher than, preferably higher than, the varnish deposit on the second region;

e) after step b) at least partially curing the radiation curable varnish printed at step b);

c1) after step e) printing by offset or flexography a curable varnish on a second substrate surface, which is different from the substrate surface covered by the security feature and the first substrate surface, and optionally on the security feature surface facing away from the substrate and the first substrate surface; and d) after step c1) curing the curable varnishes to provide a protective coating covering the security feature surface facing away from the substrate, the first substrate surface and the second substrate surface;

wherein the varnish deposit on the second region is higher than the varnish deposit on the second substrate surface.

In the manufacturing methods claimed and described herein, it is preferred that at step c1) the curable varnish is printed exclusively on the second substrate surface i.e. that step c1) consists of printing by offset or flexography a curable varnish on a second substrate surface, which is different from the substrate surface covered by the security feature and the first substrate surface. These methods enable the use of two different varnishes at steps b) and c1), which is particularly useful for the manufacturing of security documents, wherein the transparent protective coating covering the security feature surface facing away from the substrate and the first substrate surface is a glossy lacquer, and the protective coating covering the second substrate surface is a matt lacquer.

A further preferred embodiment according to the present invention is directed to a manufacturing method as described herein and comprising steps a), b), c2) and d). Hence, a further preferred embodiment according to the present invention is directed to a manufacturing method consisting of the following steps:

a) providing a security document comprising:
   a substrate,
   a security feature applied to or inserted into a portion of the substrate, wherein the security feature is selected from a windowed security thread, a security foil, a security patch, a hologram and an ink printed security feature, has a security feature thickness $t_f$ of at least 5 μm (micrometers) and a surface facing away from the substrate consisting of a first region adjacent to the edges of the security feature and a second region non-adjacent to the edges of the security feature;

b) inkjet printing a radiation curable varnish on the security feature surface facing away from the substrate and a first substrate surface adjacent to the edges of the security feature, wherein the varnish deposit on the first substrate surface is equal to or higher than the varnish deposit on the first region adjacent to the edges of the security feature, and the varnish deposit on the first region is equal to or higher than, preferably higher than, the varnish deposit on the second region;

c2) inkjet printing a radiation curable varnish on a second substrate surface, which is different from the substrate surface covered by the security feature and the first substrate surface; and d) curing the curable varnishes to provide a protective coating covering the security feature surface facing away from the substrate, the first substrate surface and the second substrate surface;

wherein the varnish deposit on the second region is higher than the varnish deposit on the second substrate surface.

Advantageously, the same radiation curable varnish and same inkjet printer is used at steps b) and c2). Thus, a more preferred embodiment according to the present invention is directed to a manufacturing method of a security document as described herein comprising the steps of:

a) providing a security document comprising:
  a substrate,
  a security feature applied to or inserted into a portion of the substrate, wherein the security feature is selected from a windowed security thread, a security foil, a security patch, a hologram and an ink printed security feature, has a security feature thickness $t_f$ of at least 5 µm (micrometers) and a security feature surface facing away from the substrate consisting of a first region adjacent to the edges of the security feature and a second region non-adjacent to the edges of the security feature;

f) inkjet printing a radiation curable varnish on the security feature surface facing away from the substrate, a first substrate surface adjacent to the edges of the security feature and on a second substrate surface, which is different from the substrate surface covered by the security feature and the first substrate surface; and d) curing the curable varnishes to provide a protective coating covering the security feature surface facing away from the substrate, the first substrate surface and the second substrate surface;

wherein the varnish deposit on the first substrate surface is equal to or higher than the varnish deposit on the first region adjacent to the edges of the security feature;

the varnish deposit on the first region is equal to or higher than, preferably higher than, the varnish deposit on the second region; and the varnish deposit on the second region is higher than the varnish deposit on the second substrate surface.

Preferably, the curable varnish used in the manufacturing method claimed herein is a radiation curable varnish, and more preferably, a UV-Vis curable varnish. When a UV-Vis curable varnish is used, step d) in the methods described herein consists of d) UV-curing the radiation curable varnish to provide a protective coating, preferably a transparent protective coating, covering the security feature surface facing away from the substrate, the first substrate surface and the second substrate surface; while step e) in the manufacturing methods described herein consists in:

e) at least partially UV-curing the radiation curable varnish printed at step b).

A further aspect according to the present invention is directed to a method of imparting chemical and mechanical resistance, and particularly chemical resistance to a security document comprising a substrate and a security feature applied to or inserted into a portion of the substrate, wherein the security feature is selected from a windowed security thread, a security foil, a security patch, a hologram and an ink printed security feature, has a security feature thickness $t_f$ of at least 5 µm (micrometers) and a security feature surface facing away from the substrate consisting of a first region adjacent to the edges of the security feature and a second region non-adjacent to the edges of the security feature, wherein said method comprises the steps of:

b) inkjet printing a radiation curable varnish on the security feature surface facing away from the substrate and a first substrate surface adjacent to the edges of the security feature, wherein the varnish deposit on the first substrate surface is equal to or higher than the varnish deposit on the first region adjacent to the edges of the security feature, and the varnish deposit on the first region is equal to or higher than, preferably higher than, the varnish deposit on the second region; and c1) printing by offset or flexography a curable varnish on a second substrate surface, which is different from the substrate surface covered by the security feature and the first substrate surface, and optionally on the security feature surface facing away from the substrate and the first substrate surface;

or c2) inkjet printing a radiation curable varnish on a second substrate surface, which is different from the substrate surface covered by the security feature and the first substrate surface;

and d) curing the curable varnishes to provide a protective coating covering the security feature surface facing away from the substrate, the first substrate surface and the second substrate surface;

wherein the varnish deposit on the second region is higher than the varnish deposit on the second substrate surface; and the protective coating covering the security feature surface facing away from the substrate and the first substrate surface is transparent.

In the method of imparting chemical and mechanical resistance to a security document described herein, step c1) may be conducted before step b). Alternatively, step b) may be conducted before step c1) in which case the method further comprises step e) conducted between steps b) and c1):

e) at least partially curing the radiation curable varnish printed at step b).

In the method described herein it is preferred that at step c1) the curable varnish is printed exclusively on the second substrate surface.

A further preferred method of imparting chemical and mechanical resistance to a security document comprises steps a), b), c2) and d).

The present invention is now described in more detail with respect to the non-limiting figures and the non-limiting examples.

Figure 2:
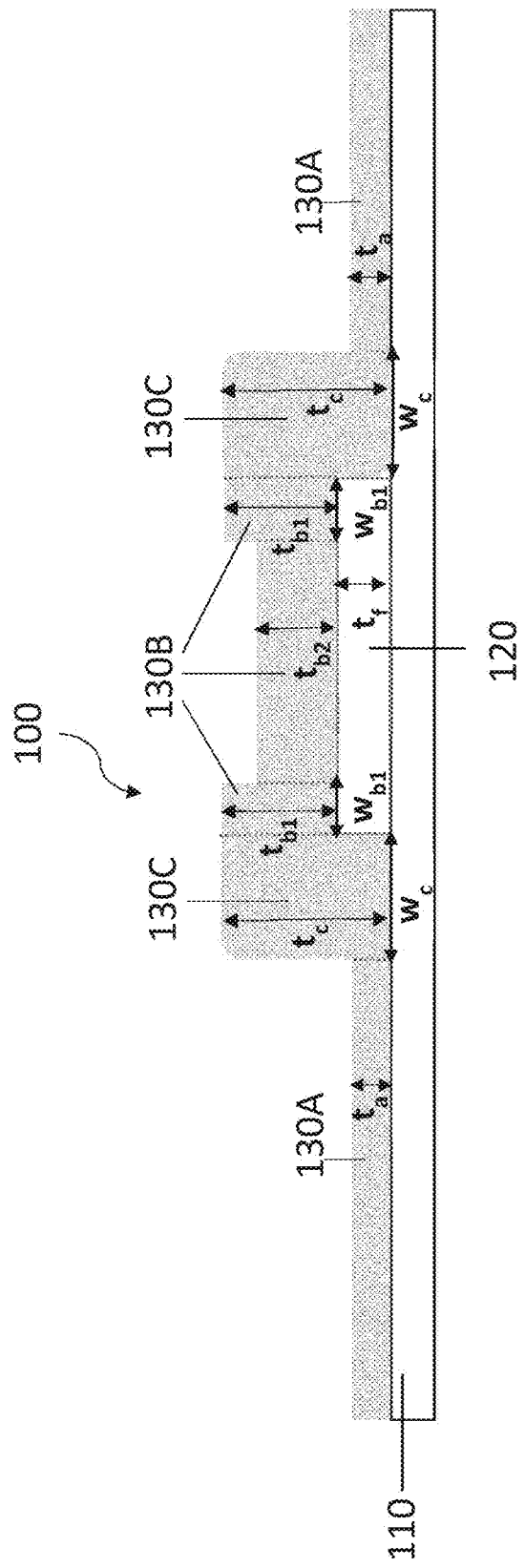
Figure 3:
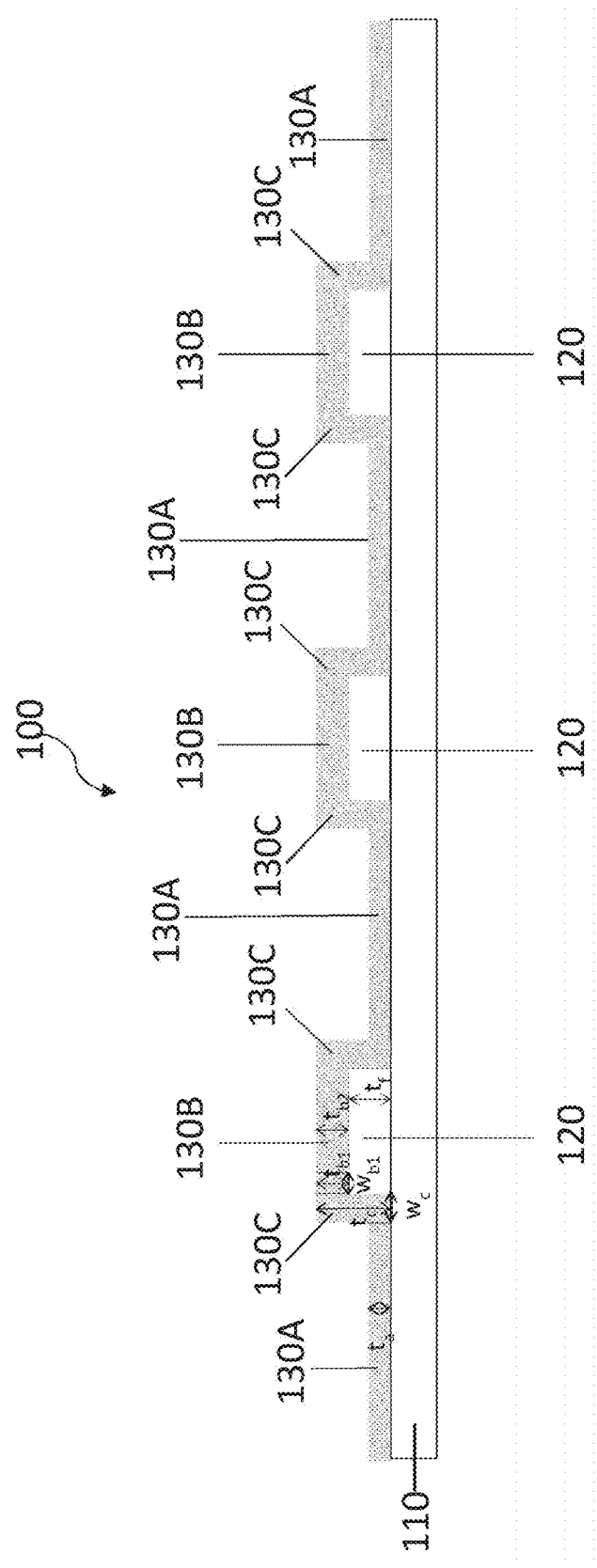

Some examples of security documents according to the present invention are now described in detail with reference to the accompanying figures, which for clarity reasons are not in proportional scale:

FIG. 1-FIG. 3 schematically illustrate cross-sections of a security document (100) according to the present invention.

Figure 4C:
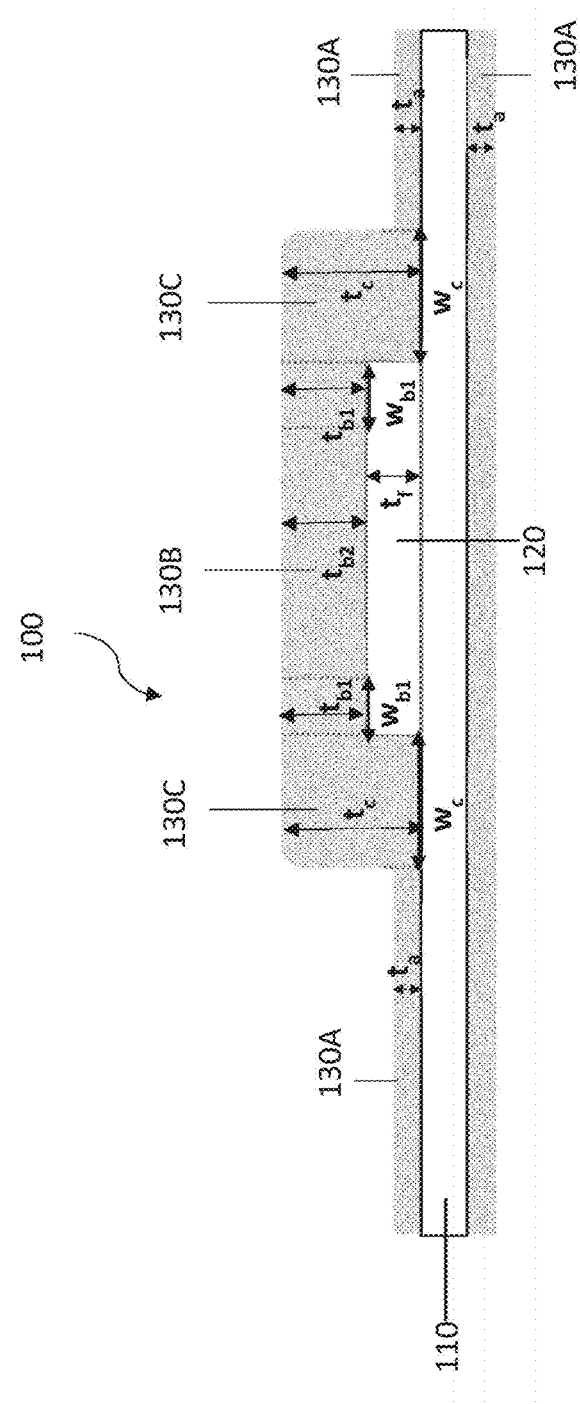

FIG. 4A and FIG. 4B schematically illustrate top-views of a security document (100) according to the present invention. FIG. 4C schematically illustrates a cross-section of the security document (100) depicted by FIG. 4A and FIG. 4B.

FIG. 1 schematically depicts a cross-section of a security document (100) according to the present invention, wherein the security document (100) comprises a substrate (110) that is not transparent, a security feature (120) applied to a portion of the substrate (110) and a protective coating (130A, 130B, 130C) covering the surface of the security feature (120) facing away from the substrate (110), a first substrate surface adjacent to the edges of the security feature (120) and a second substrate surface, which is different from the substrate surface covered by the security feature (120) and the first substrate surface. The protective coating (130B, 130C) covering the security feature surface facing away from the substrate (110) and the first substrate surface is transparent. The security document (100) comprises a coating-free region situated on the same side of the security document as the security feature (120). The thickness $t_c$ of the transparent protective coating (130C) covering the first substrate surface is equal to the sum of the thickness $t_f$ of the security feature (120) and the thickness $t_{b2}$ of the transparent protective coating (130B) covering the second region of the security feature (120). The thickness $t_{b1}$ of the transparent protective coating (130B) covering the first region of the security feature (120) is equal to the thickness $t_{b2}$ of the transparent protective coating (130B) covering the second region, which is larger than the thickness $t_a$ of the protective coating (130A) covering the second substrate surface. Further, the thickness $t_f$ of the security feature is larger than the thickness $t_a$ of the protective coating (130A) covering the second substrate surface.

FIG. 2 schematically depicts a cross-section of a security document (100) according to the present invention, wherein the security document (100) comprises a substrate (110), a security feature (120) applied to a portion of the substrate (110) and a protective coating (130A, 130B, 130C) covering the surface of the security feature (120) facing away from the substrate (110), a first substrate surface adjacent to the edges of the security feature (120) and a second substrate surface, which is different from the substrate surface covered by the security feature (120) and the first substrate surface. The protective coating (130B, 130C) covering the security feature surface facing away from the substrate (110) and the first substrate surface is transparent. The thickness $t_c$ of the transparent protective coating (130C) covering the first substrate surface is larger than the sum of the thickness $t_f$ of the security feature (120) and the thickness $t_{b2}$ of the transparent protective coating (130B) covering the second region of the security feature (120). The thickness $t_{b1}$ of the transparent protective coating (130B) covering the first region of the security feature (120) is larger than the thickness $t_{b2}$ of the transparent protective coating (130B) covering the second region, which is larger than the thickness $t_a$ of the protective coating (130A) covering the second substrate surface. Further, the thickness $t_f$ of the security feature is larger than the thickness $t_a$ of the protective coating (130A) covering the second substrate surface.

FIG. 3 depicts a cross-section of a security document (100) according to the present invention, wherein the security feature (120) is a windowed security thread inserted into a portion of the substrate (110). For simplicity reasons, the portion of the windowed security feature embedded in the substrate (110) is not shown. As for FIG. 1, the thickness $t_c$ of the transparent protective coating (130C) covering the first substrate surface is equal to the sum of the thickness $t_f$ of the security feature (120) and the thickness $t_{b2}$ of the transparent protective coating (130B) covering the second region of the security feature (120). The thickness $t_{b1}$ of the transparent protective coating (130B) covering the first region of the security feature (120) is equal to the thickness $t_{b2}$ of the transparent protective coating (130B) covering the second region, which is larger than the thickness $t_a$ of the protective coating (130A) covering the second substrate surface. Further, the thickness $t_f$ of the security feature is larger than the thickness $t_a$ of the protective coating (130A) covering the second substrate surface.

FIG. 4A, FIG. 4B and FIG. 4C show a security document (100) according to the present invention. Specifically, FIG. 4A schematically illustrates a top-view of a security document (100) according to the present invention from the side of the security document onto which the security feature is applied, while FIG. 4B schematically illustrates a top-view of the same security document (100) from the opposite side of the security document. As shown by FIG. 4A and FIG. 4B, the transparent protective coating (130A, 130B, 130C) covers the entire surface of the substrate (110). FIG. 4C schematically illustrates a cross-section of the security document (100) depicted in FIG. 4a along the axis A-A'.

EXAMPLES

The present invention is now described in greater detail with respect to non-limiting examples.

I. General Procedure for the Preparation of Security Documents

A first metallized foil (F1) (H1010 Sequins Foil from PROFOIL, www.profoil.com, thickness of about 10 µm as determined by cross section observation on microscope) was used as security feature for the examples E1-E3 and the comparative examples C1-C6. Following application of an adhesive layer (Joncryl® HSL 9032 from BASF) by hand-coating (k coater bar 0) to the foil surface opposite to the metal layer, the first metallized foil F1 (120) (20 mm×20 mm) was applied by hot stamping at 150° C. with a lab equipment (HSG-CC-Heat Sealing from Brugger Feinmechanik München) to a polymer substrate (45 mm×45 mm) (Guardian™ from CCL Secure) to provide a first substrate to a portion of which a metallized foil F1 was applied as a security feature.

A second metallized foil (F2) (commercial hot stamping foil, thickness of about 10 µm) was used as security feature for the examples E4-E5 and the comparative examples C7-C13. The second metallized foil (F2) (120) (22 mm×12 mm) was applied by hot stamping at 150° C. with a lab equipment (HSG-CC-Heat Sealing from Brugger Feinmechanik München) to a polymer substrate (45 mm×30 mm) (Guardian™ from CCL Secure) to provide a second substrate to a portion of which a metallized foil F2 was applied as a security feature.

A UV-curable varnish was prepared by mixing the components listed in Table 1 for one hour at room temperature at 1000 rpm using a Dispermat (LC220-12). The UV-curable varnish had a viscosity of 12.5 mPa·s at 45° C. and 1000 s$^{-1}$ as determined using a Heake Roto-Visco RV1 with a cone (DHR-2 from TA Instruments, cone plane geometry, diameter 40 mm).

TABLE 1

| | | Composition UV-curable varnish: | | |
|---|---|---|---|---|
| Ingredient | Commercial name (Supplier) | Chemical name (CAS number) | | wt-% |
| cationically curable monomer | UVI-Cure S105ES (Lambson) | 7-oxabicyclo[4.1.0]hept-3-ylmethyl 7-oxabicyclo[4.1.0]heptane-3-carboxylate; (2386-87-0) | | 51.30% |
| mixture of radically curable monomers | Photomer ® 3016-20G (IGM) | mixture of bisphenol A epoxy acrylate (CAS no.: 55818-57-0) and glycerol propoxy triacrylate (CAS no.: 52408-84-1) | | 6.0% |
| reactive diluent | VEEA (Nippon Shokubai) | 2-[2-(vinyloxy)ethoxy]ethyl acrylate (86273-46-3) | | 35.0% |
| radical photoinitiator | Speedcure 73 (Lambson) | 2-hydroxy-2-methyl-1-phenylpropanone (7473-98-5) | | 0.85% |
| cationic photoinitiator | Speedcure 992 (Lambson) | 40% (4-{[4-(diphenylsulfanylium) phenyl]sulfanyl}phenyl)diphenyl-sulfonium bishexafluorophosphate (CAS no.: 74227-35-3) in propylene carbonate (CAS no.: 108-32-7) | | 6.35% |
| surface additive | BYK UV 3510 (BYK Chemie) | octamethylcyclotetrasiloxane; (556-67-2) | | 0.5% |

The UV-curable varnish was applied by drop-on-demand (DOD) inkjet printing using a KM1024i inkjet head (from Konica Minolta) to the above-described first and second polymer substrate carrying the first (F1) and the second (F2) metallized foil, respectively so that to cover the metallized foil (F1, F2) surface facing away from the substrate, the first polymer substrate surface adjacent to the edges of the metalized foil and the second substrate surface, which is different from the substrate surface covered by the metallized foil (F1, F2) and the first substrate surface. The varnish deposits (g/m$^2$) are summarized in Table 2.

The applied inkjet varnish was cured by irradiation using a conveyor (Aktiprint mini 18-2; 12 m/min) and a Hg-lamp (Power of the 2 tubes 80 Watt/cm), corresponding to an irradiation dose of 500 mJ/cm$^2$ to provide a transparent protective coating covering the metallized foil (F1, F2) surface facing away from the substrate, the first substrate surface adjacent to the edges of the metalized foil (F1 or F2) and the second substrate surface, which is different from the substrate surface covered by the metallized foil (F1 or F2) and the first substrate surface. Microscope analysis of the obtained samples attested a proportionality between varnish deposit on a surface and the thickness of the resulting transparent coating covering said surface. For example, a varnish deposit of 7 g/m$^2$ resulted in a coating thickness of about 6.5 μm, while a varnish deposit of 30 g/m$^2$ resulted in a coating thickness of about 29.5 μm.

II. Evaluation of the Chemical Resistance

II.a General Procedure for Evaluating the Chemical Resistance to Acetone

The samples E1-E5 and C1-C13 prepared as described at Item I above were dipped in acetone for five minutes at room temperature. The samples were removed from the solvent and let dry at room temperature for a few seconds. The aspect of the foil was assessed according to the rating described in Table 2 below.

II.b General Procedure for Evaluating the Chemical Resistance to Sodium Sulfide Solution The samples E1-E5 and C1-C13 were dipped in an aqueous sodium sulfide solution (124 g/l) for thirty minutes at room temperature. The samples were removed from the solution, rinsed with deionized water and dried by gently dabbing with a cotton fabric. The aspect of the foil was assessed according to the rating described in Table 2 below.

TABLE 2

| | Rating of the chemical resistance tests |
|---|---|
| Rating | Test result |
| 1 | Complete destruction of the security feature (metallized foil) |
| 2 | Major changes of the security feature (metallized foil) i.e. more than 50% of the security feature destroyed |
| 3 | Significant changes of the security feature (metallized foil) i.e. less than 50% of the security feature destroyed |
| 4 | Minor changes of the security feature (metallized foil) visible to the naked eye |
| 5 | No change of the security feature (metallized foil), i.e. complete preservation |

Table 3 summarizes the results obtained in chemical resistance tests for samples E1-E5 according to the present invention and comparative samples C1-C13 based on the rating described in Table 2, The resistance tests values of Table 3 were the averaged values of 2 samples for C1-C6 and E1-E3 in the acetone resistance test, 3 samples for C1-C6 and E1-E3 in the sodium sulfide resistance test, 5 samples for C7, 2 samples for E4-E5 and C8-C13.

TABLE 3

Chemical resistance test results

| Foil | Example no. | Varnish deposit (g/m$^2$) applied on | | | | Chemical resistance test rating | |
|---|---|---|---|---|---|---|---|
| | | Second substrate surface[d] | Second region metallized foil[b] | First substrate surface[c] | First region metallized foil[a] | Acetone | Sodium Sulfide |
| F1 | C1 | 0 | 0 | 0 | 0 | 1 | 1 |
| | C2 | 2 | 2 | 2 | 2 | 3 | 1 |
| | C3 | 7 | 7 | 7 | 7 | 5 | 2 |
| | C4 | 15 | 15 | 15 | 15 | 5 | 3 |
| | C5 | 20 | 20 | 20 | 20 | 5 | 4 |
| | C6 | 30 | 30 | 30 | 30 | 5 | 5 |
| | E1 | 2 | 7 | 15 | 15 | 5 | 4 |
| | E2 | 2 | 7 | 20 | 20 | 5 | 4 |
| | E3 | 2 | 7 | 30 | 30 | 5 | 5 |
| F2 | C7 | 0 | 0 | 0 | 0 | 1 | 3 |
| | C8 | 2 | 2 | 2 | 2 | 1 | 2 |
| | C9 | 5 | 5 | 5 | 5 | 2 | 1 |
| | C10 | 7 | 7 | 7 | 7 | 3 | 3 |
| | C11 | 10 | 10 | 10 | 10 | 4 | 1 |
| | C12 | 15 | 15 | 15 | 15 | 3 | 2 |
| | C13 | 20 | 20 | 20 | 20 | 5 | 5 |
| | E4 | 2 | 7 | 15 | 15 | 5 | 5 |
| | E5 | 2 | 7 | 20 | 20 | 5 | 5 |

[a] The first region of the metallized foil (F1, F2) is the region of the surface of the metallized foil facing away from the substrate, which is delimited by the edges of the metallized foil (F1 or F2) and has a constant width $w_{b1}$ of about 2 mm for the metallized foil F1 and a constant width $w_{b1}$ of about 2 mm for the metallized foil F2.
[b] The second region of the metallized foil (F1, F2) is the region of the surface of the metallized foil (F1, F2) facing away from the substrate, which is complimentary to the first region of the surface of the metallized foil facing away from the substrate and which has an area of 16 mm × 16 mm for the metallized foil F1 and an area of 18 mm × 8 mm for the metallized foil F2.
[c] The first substrate surface is the substrate surface adjacent to the edges of the metallized foil (F1 or F2) having a constant width $w_c$ of about 3 mm for the first substrate carrying the first metallized foil F1 and a constant width $w_c$ of about 2 mm for the second substrate carrying the second metallized foil F2.
[d] The second substrate surface is the substrate surface surrounding or bordering the first substrate surface i.e. internally delimited by an area of 26 mm × 26 mm for the first substrate carrying the first metallized foil F1 and an area of 26 mm × 16 mm for the second substrate carrying the second metallized foil F2, and externally delimited by an area of 32 mm × 32 mm for the first substrate carrying the first metallized foil F1 and an area of 40 mm × 25 mm for the second substrate carrying the second metallized foil F2.

As attested by Table 3, no chemical resistance improvement, in particular to solvents such as acetone, and sodium sulfide solution, can be observed for samples C2, C8 and C9 characterized by a protective coating thickness typically used on security documents, such as banknotes, when compared to the uncoated reference samples C1 and C7.

Higher uniform varnish deposits resulting in larger uniform coating thicknesses (samples C3-C4, C10-C12) increase the resistance to solvents, such as acetone, but are not efficiently protecting the security feature against the sodium sulfide solution.

Only very large varnish deposits resulting in very large uniform protective coating thicknesses (C5, C6 and C13) provide a good protection against solvent and sodium sulfide solution. However, such large varnish thicknesses on the whole surface of a security document, such as banknote, do not constitute a viable solution because of technical reasons, such as the stiffness of the coated security document, and cost reasons.

Samples E1-E5 according to the present invention show the effect of a variable protective coating thickness on the surface of a security document with larger coating thicknesses ($t_c$, $t_{b1}$) on the first substrate surface, which is adjacent to the edges of the metallized foil (F1, F2) and the first region of the metallized foil (F1, F2) surface facing away from the substrate than on the remaining surface of the security document, wherein the coating thickness $t_c$ on the first substrate surface is larger than the thickness $t_f$ of the security feature and larger or equal to the coating thickness $t_{b1}$ on the first region of the metallized foil, as compared to the unvarnished reference sample (C1 and C7) and to the uniformly varnished samples (C2-C4 and C8-C12).

As can be seen for samples E1-E5 the metallized foil (F1, F2) was well preserved when applying a large varnish deposit (15-30 g/m$^2$ for the specific UV-curable varnish used herein and the specific metallized foil thicknesses used herein) resulting in a large transparent protective coating thickness on the first region of the metallized foil (F1, F2) and the first substrate surface and a middle varnish deposit (7 g/m$^2$ for the specific UV-curable varnish used herein and the specific metallized foil thicknesses used herein) resulting in a middle coating thickness on the second region of the metallized foil (F1, F2), while keeping a typical varnish deposit (2 g/m$^2$) resulting in a typical coating thickness on the second substrate surface.

Samples E1-E5 exhibit excellent resistance reflected by no or little change of the metallized foil aspect both in the sodium sulfide test and the acetone test.

III. Haze Measurement

The haze of the UV-curable inkjet varnish of Table 1 and of a standard UV-curable flexographic printing varnish (Example C4 as described by the international patent application publication no. WO2014067715A1) was measured according to ASTM D1003 (Standard Test Method for Haze and Luminous Transmittance of Transparent Plastics) using a DC 650 Spectrophotometer (from DATACOLOR).

The UV-curable inkjet printing varnish of Table 1 and the standard UV-curable flexographic printing varnish (Example C4 as described by the international patent application publication no. WO2014067715A1) were each applied on a BOPP polymeric banknote substrate. The UV-curable inkjet printing varnish of Table 1 was applied by inkjet printing using the inkjet printhead KM 1024i at 720 dpi as a 5 g/m² varnish deposit and a 30 g/m² varnish deposit, respectively.

The standard UV-curable flexographic printing varnish (Example C4 as described by the international patent application publication no. WO2014067715A1) was applied using a K-bar handcoater Nr 0 (from RK Printcoat Instruments) as a 5 g/m² varnish deposit.

The haze of the uncoated polymeric banknote substrate was about 3%.

The haze of the polymeric banknote substrate coated with the standard UV-curable flexographic printing varnish (Example C4 as described by the international patent application publication no. WO2014067715A1) was about 10%. Such UV-curable flexographic varnish is not suitable to be printed at 5 g/m² on the surface of the security feature and on the first substrate surface. A varnish deposit lower than about 5 g/m², preferably of between about 1 and 3 g/m², of such UV-curable flexographic varnish could be applied on the second substrate surface. However, for the specific case of security documents, wherein the portion of the substrate to which the security feature is applied is a transparent polymer, such UV-curable flexographic varnish should be omitted on the surface of the transparent polymer portion that is opposite to the surface of the transparent polymer portion to which the security feature is applied so that to ensure that the properties of the security feature applied to the transparent polymer are not impaired.

The haze of the polymeric banknote substrate coated with the UV-curable inkjet printing varnish of Table 1 at 5 g/m² varnish deposit and 30 g/m² varnish deposit was similar (±1%) to the haze of the non-varnished polymeric banknote substrate. Such UV-curable inkjet varnish can be printed on any surface of the security document, including on the security feature surface and the first substrate surface.

The invention claimed is:

1. A security document comprising:
    a substrate,
    a security feature applied to or inserted into a portion of the substrate wherein the security feature is selected from a windowed security thread, a security foil, a security patch, a hologram and an ink printed security feature, has a security feature thickness $t_f$ of at least about 5 µm and a security feature surface facing away from the substrate consisting of a first region adjacent to the edges of the security feature and a second region non-adjacent to the edges of the security feature, and
    a protective coating covering
        the security feature surface,
        a first substrate surface adjacent to the edges of the security feature, and
        a second substrate surface which is different from the substrate surface covered by the security feature and the first substrate surface;
    wherein
    the protective coating covering the security feature surface facing away from the substrate and the first substrate surface is transparent,
    the protective coating covering the first region has a thickness $t_{b1}$,
    the protective coating covering the second region has a thickness $t_{b2}$,
    the protective coating covering the first substrate surface has a thickness $t_c$, and
    the protective coating covering the second substrate surface has a thickness $t_a$;
    wherein the thickness $t_c$ is larger than the thickness $t_f$, which is larger than the thickness $t_a$;
    the thickness $t_{b2}$ is larger than the thickness $t_a$; and
    either the thickness $t_c$ is larger than the thickness $t_{b1}$, which is larger than or equal to the thickness $t_{b2}$;
    or the thickness $t_c$ is equal to the thickness $t_{b1}$, which is larger than the thickness $t_{b2}$.

2. The security document according to claim 1, wherein the thickness $t_a$ is lower than about 5 µm.

3. The security document according to claim 1, wherein the thickness $t_c$ is larger than or equal to the sum of the thickness $t_f$ and the thickness $t_{b2}$.

4. The security document according to claim 1, wherein the transparent protective coating covering the security feature surface facing away from the substrate and the first substrate surface and the protective coating covering the second substrate surface are each obtained from a different curable varnish.

5. The security document according to claim 1, wherein the transparent protective coating covering the security feature surface facing away from the substrate and the first substrate surface consists of a single layer.

6. The security document according to claim 1, wherein the protective coating covering the second substrate surface is a matt lacquer and/or the transparent protective coating covering the security feature surface facing away from the substrate and the first substrate surface is a glossy lacquer.

7. The security document according to claim 1, wherein the protective coating consists of a single transparent layer.

8. The security document according to claim 1, wherein the portion of the substrate to which the security feature is applied is a transparent polymer.

9. The security document according to claim 1, wherein the second substrate surface comprises the substrate surface on both sides of the security document other than the substrate surface covered by the security feature and the first substrate surface.

10. The security document according to claim 1, wherein the thickness $t_a$ is between about 1 and 3 µm.

11. A method of manufacturing the security document according claim 1 comprising the steps:
    a) providing a security document comprising:
        a substrate,
        a security feature applied to or inserted into a portion of the substrate, wherein the security feature is selected from a windowed security thread, a security foil, a security patch, a hologram and an ink printed security feature, has a security feature thickness $t_f$ of at least about 5 µm and a security feature surface facing away from the substrate consisting of a first region adjacent to the edges of the security feature and a second region non-adjacent to the edges of the security feature;
    b) inkjet printing a radiation curable varnish on the security feature surface facing away from the substrate and a first substrate surface adjacent to the edges of the security feature, wherein the varnish deposit on the first substrate surface is equal to or higher than the varnish deposit on the first region adjacent to the edges of the security feature, and the varnish deposit on the first region is equal to or higher than the varnish deposit on the second region; and
    c1) printing by offset or flexography a curable varnish on a second substrate surface which is different from the substrate surface covered by the security feature and the first substrate surface and optionally on the security feature surface facing away from the substrate and the first substrate surface;

or c2) inkjet printing a radiation curable varnish on a second substrate surface which is different from the substrate surface covered by the security feature and the first substrate surface;

and d) curing the curable varnishes to provide a protective coating covering the security feature surface facing away from the substrate, the first substrate surface and the second substrate surface;

wherein the varnish deposit on the second region is higher than the varnish deposit on the second substrate surface.

12. The manufacturing method according to claim 11, wherein step c1) is conducted before step b).

13. The manufacturing method according to claim 11, wherein step b) is conducted before step c1) and further comprising step e) conducted between steps b) and c1):

e) at least partially curing the radiation curable varnish printed at step b).

14. The manufacturing method according to claim 11, wherein at step c1) the curable varnish is printed exclusively on the second substrate surface.

15. The manufacturing method according to claim 11, wherein the manufacturing method comprises the steps a), b), c2) and d).

16. The manufacturing method according to claim 11, wherein the varnish deposit on the second substrate surface is below 5 $g/m^2$.

17. The manufacturing method according to claim 11, wherein the varnish deposit on the second substrate surface is between about 1 and about 3 $g/m^2$.

* * * * *